United States Patent
Song et al.

(10) Patent No.: US 9,158,415 B2
(45) Date of Patent: Oct. 13, 2015

(54) TOUCH PANEL, METHOD FOR DRIVING TOUCH PANEL, AND DISPLAY APPARATUS HAVING TOUCH PANEL

(75) Inventors: Byungsoo Song, Seoul (KR); Seonghak Moon, Seoul (KR); Victor Pushchin, Moscow (RU); Sungchul Kim, Seoul (KR); Munbong Song, Seoul (KR); Youngjoon Lee, Seoul (KR); Byungchun Yu, Seoul (KR); Byeongkil Ahn, Seoul (KR); Svetlana Volodkina, Moscow (RU)

(73) Assignees: LG Electronics Inc., Seoul (KR); LG Display Co., Ltd., Seoul (KR)

(*) Notice: Subject to any disclaimer, the term of this patent is extended or adjusted under 35 U.S.C. 154(b) by 470 days.

(21) Appl. No.: 13/143,163
(22) PCT Filed: Nov. 5, 2010
(86) PCT No.: PCT/KR2010/007807
§ 371 (c)(1), (2), (4) Date: Jul. 1, 2011
(87) PCT Pub. No.: WO2011/062389
PCT Pub. Date: May 26, 2011

(65) Prior Publication Data
US 2011/0261020 A1    Oct. 27, 2011

(30) Foreign Application Priority Data
Nov. 18, 2009   (KR) .................. 10-2009-0111621

(51) Int. Cl.
G06F 3/042   (2006.01)
G06F 3/03    (2006.01)

(52) U.S. Cl.
CPC ............ G06F 3/0421 (2013.01); *G06F 3/0304* (2013.01); *G06F 3/042* (2013.01); *G06F 3/0428* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,672,364 | A * | 6/1987 | Lucas | 341/20 |
| 4,893,120 | A * | 1/1990 | Doering et al. | 341/31 |
| 6,429,857 | B1 * | 8/2002 | Masters et al. | 345/175 |
| 6,690,363 | B2 * | 2/2004 | Newton | 345/173 |
| 6,927,384 | B2 | 8/2005 | Reime | |
| 7,042,444 | B2 | 5/2006 | Cok | |
| 8,022,941 | B2 * | 9/2011 | Smoot | 345/175 |
| 8,907,925 | B2 * | 12/2014 | Park et al. | 345/175 |
| 2002/0033805 | A1 * | 3/2002 | Fujioka et al. | 345/175 |
| 2002/0118461 | A1 * | 8/2002 | Seino et al. | 359/627 |
| 2002/0175900 | A1 * | 11/2002 | Armstrong | 345/173 |

(Continued)

FOREIGN PATENT DOCUMENTS

| | | |
|---|---|---|
| JP | 11-45155 A | 2/1999 |
| JP | 2000-267810 A | 9/2000 |
| KR | 10-2007-0082958 A | 8/2007 |

OTHER PUBLICATIONS

Japan publication No. 2000267810 by Kiyono Takeshi on Sep. 29, 2000.*

Primary Examiner — Linh N Hoffner
(74) Attorney, Agent, or Firm — Birch, Stewart, Kolasch & Birch, LLP

(57) ABSTRACT

A touch panel includes: a substrate; a plurality of light emitting elements; and a plurality of light receiving elements, wherein the number of light receiving elements may be greater than the number of light emitting elements.

9 Claims, 19 Drawing Sheets

(56) References Cited

U.S. PATENT DOCUMENTS

| | | | |
|---|---|---|---|
| 2006/0132454 A1* | 6/2006 | Chen et al. .................... | 345/173 |
| 2009/0135162 A1* | 5/2009 | Van De Wijdeven et al. | 345/175 |
| 2009/0189878 A1* | 7/2009 | Goertz et al. ................ | 345/175 |
| 2010/0309169 A1* | 12/2010 | Lieberman et al. ........... | 345/175 |
| 2011/0115748 A1* | 5/2011 | Xu ................................ | 345/175 |
| 2011/0157097 A1* | 6/2011 | Hamada et al. ................ | 345/175 |
| 2011/0227874 A1* | 9/2011 | Fahraeus et al. .............. | 345/175 |

\* cited by examiner

TOUCH PANEL, METHOD FOR DRIVING TOUCH PANEL, AND DISPLAY APPARATUS HAVING TOUCH PANEL

FIELD

The present invention relates to a touch panel, a method for driving a touch panel, and a display apparatus having a touch panel.

RELATED ART

In general, a touch panel is an input device attached to a surface of a display panel and devised to execute a predetermined command when a user presses a portion corresponding to an icon or a select button displayed on a screen of the display panel with his finger, a pen, or the like.

The touch panel is simply manipulated compared with other input devices, so it is commonly used for an electronic unmanned guiding device, and the like.

SUMMARY

According to an aspect of the present invention, there is provided a touch panel including: a substrate; a plurality of light emitting elements; and a plurality of light receiving elements, wherein the number of light receiving elements may be greater than the number of light emitting elements.

At least one light receiving element may be disposed between two light emitting elements.

At least two light receiving elements may be continuously disposed.

The space between two continuously disposed light receiving elements may be greater than the shortest space between a certain light emitting element and the light receiving element.

The space between two adjacent light receiving elements may be smaller than the space between two adjacent light emitting elements.

An extending line perpendicular to the substrate among the plurality of light emitting elements may correspond to an area between two adjacent light receiving elements.

The plurality of light emitting elements may include a first light emitting element disposed at a first area side of the substrate and a second light emitting element disposed at a second area side that faces the first area of the substrate, and the first and second light emitting elements may overlap in a direction perpendicular to the first and second areas.

A plurality of light emitting elements and a plurality of light receiving elements may be disposed at the first area side of the substrate and the second area side that faces the first area of the substrate, respectively, and the light receiving element may be disposed at both ends of the first area side and both ends of the second area side.

The light emitting element and the light receiving element may be alternately disposed at the first and second area sides.

A plurality of light emitting elements and a plurality of light receiving elements may be disposed at the first area side and a third area side adjacent to the first area, and the light receiving element may be disposed at the first and the third area sides at the boundary of the first and third area sides.

According to another aspect of the present invention, there is provided a touch panel including: a substrate; a plurality of light emitting elements; and a plurality of light receiving elements, wherein the space between an end of the substrate and the light receiving element and the space between the end of the substrate and the light emitting element may be different.

The shortest space between the end of the substrate and the light receiving element may be smaller than the shortest space between the end of the substrate and the light emitting element.

According to another aspect of the present invention, there is provided a touch panel including: a substrate; a plurality of light emitting elements; and a plurality of light receiving elements, wherein the plurality of light receiving elements disposed abreast at a first area of the substrate may include first and second light receiving elements, and when a first light emitting element, among the plurality of light emitting elements, emits light, the first light receiving element may be turned on and the second light receiving element may be turned off.

The space between the first light emitting element and the first light receiving element may be smaller than the space between the first light emitting element and the second light receiving element.

According to another aspect of the present invention, there is provided a touch panel including: a substrate; a plurality of light emitting elements; and a plurality of light receiving elements, wherein the plurality of light emitting elements may include first and second light emitting elements, and the number of light receiving element turned on correspondingly according to the first light emitting element may be different from the number of light receiving elements turned on correspondingly according to the second light emitting element.

The first and second light emitting elements may be disposed abreast.

The first light emitting element may be disposed at a longer side of the substrate, the second light emitting element may be disposed at a shorter side of the substrate, and the number of light receiving element turned on correspondingly according to the first light emitting element may be larger than the number of light receiving elements turned on correspondingly according to the second light emitting element.

According to another aspect of the present invention, there is provided a display device including a touch panel, including: a display panel, a plurality of light emitting elements disposed at an edge of the display panel; a plurality of light receiving elements disposed at an edge of the display panel, wherein the number of light receiving elements may be larger than that of the light emitting elements.

According to another aspect of the present invention, there is provided a display device including a touch panel, including: a display panel; a plurality of light emitting elements disposed at an edge of the display panel; a plurality of light receiving elements disposed at an edge of the display panel, wherein the space between an end of the display panel and the light receiving element and the space between the end of the substrate and the light emitting element may be different.

According to another aspect of the present invention, there is provided a display device including a touch panel, including: a display panel; a plurality of light emitting elements disposed at an edge of the display panel; a plurality of light receiving elements disposed at an edge of the display panel, wherein a plurality of light receiving elements disposed abreast at a first area of the display panel may include first and second light receiving elements, and when a first light emitting element, among the plurality of light emitting elements, emits light, the first light receiving element is turned on and the second light receiving element is turned off.

According to another aspect of the present invention, there is provided a display device including a touch panel, including: a display panel; a plurality of light emitting elements disposed at an edge of the display panel; a plurality of light receiving elements disposed at an edge of the display panel, wherein the plurality of light emitting elements may include first and second light emitting elements, and the number of light receiving elements turned on correspondingly according to the first light emitting element may be different from the number of light receiving elements turned on correspondingly according to the second light emitting element.

The light emitting elements and the light receiving elements may be disposed at an outer edge of an active area of the display panel on which an image is displayed.

According to another aspect of the present invention, there is provided a method for driving a touch panel including a plurality of light emitting elements and a plurality of light receiving elements, including: a radiation step of sequentially turning on the plurality of light emitting elements to radiate beams; a light receiving step of turning on the plurality of light receiving elements to receive the beams radiated by the light emitting elements; and a position calculation step of grouping a plurality of detection data according to the position of the light emitting elements and light reception data of the plurality of light receiving elements turned on correspondingly according to each of the light emitting elements to calculate a touched position, wherein the position calculation step may include: a mapping step of mapping the plurality of detection data to orthogonal coordinates system; a first central point acquiring step of primarily converting the mapped detection data to associate the plurality of mapped detection data corresponding to the same position and acquiring data regarding a central point of the mapped detection data; a reverse conversion step of reversely converting the data regarding the central point to acquire converted detection data; and a step of calculating a cross point of the converted detection data to acquire a touched position.

In the light receiving step, when each of the light emitting elements are turned on, the plurality of light receiving elements may be turned on and the other remaining light receiving elements may be turned off.

The detection data may include data regarding the position of the luminance element and the position of a light receiving element, which has failed to detect a beam of the light emitting element, among the plurality of light receiving elements turned on correspondingly according to the luminance element which is turned on.

The first central point acquiring step may further includes: a step of acquiring the number of touches through the central point.

According to another aspect of the present invention, there is provided a method for driving a touch panel including a plurality of light emitting elements and a plurality of light receiving elements, including: a radiation step of sequentially turning on the plurality of light emitting elements to radiate beams; a light receiving step of turning on the plurality of light receiving elements to receive the beams radiated by the light emitting elements; a step of converting a plurality of detection data according to the position of the light emitting elements light reception data of the plurality of light receiving elements turned on correspondingly according to each of the light emitting elements to acquire a central point of each of the detection data; and a position calculation step of reversely converting data regarding the central point to calculate a touched position.

According to another aspect of the present invention, there is provided a touch panel including: a substrate formed to substantially have a quadrangular shape, having first and second areas which face each other and third and fourth areas which face each other, the third area being positioned to be adjacent to the first and second areas and the fourth area being positioned to be adjacent to the first and second areas at a position at which it faces the third area; a plurality of light emitting elements disposed at the first area of the substrate and emitting light in the form of a radiation shape having a certain angle; and a plurality of light receiving elements disposed at the second area of the substrate, wherein when a first light emitting element, among the plurality of light emitting elements, emits light, at least one light receiving element positioned within a light radiation coverage of the first light emitting element is turned on and the light receiving element positioned to be out of the light radiation coverage of the first light emitting element is turned off.

At least three light receiving elements positioned within the light radiation coverage of the first light emitting element may be turned on.

The space between the light receiving element turned on correspondingly according to the light emission of the first light emitting element and the first light emitting element may be smaller than the space between the light receiving element in an OFF state correspondingly according to the light emission of the first light emitting element and the first light emitting element.

The light receiving element tuned on correspondingly according to a light emission of the first light emitting element may be positioned at the shortest distance from the first light emitting element.

When a light emitting element positioned at a central portion of the first area is a central light emitting element and a light emitting element positioned at the end of the first area is an outer light emitting element, the number of light receiving elements turned on correspondingly according to a light emission of the central light emitting element may be different from the number of light receiving elements turned on correspondingly according to a light emission of the outer light emitting element.

The number of light receiving elements turned on correspondingly according to a light emission of the outer light emitting element may be greater than the number of light receiving elements turned on correspondingly according to a light emission of the central light emitting element.

The radiation angle of the outer light emitting element may be greater than that of the central light emitting element.

BRIEF DESCRIPTION OF THE DRAWINGS

The accompany drawings, which are included to provide a further understanding of the invention and are incorporated on and constitute a part of this specification, illustrate embodiments of the invention and together with the description serve to explain the principles of the invention.

DETAILED DESCRIPTION

Reference will now be made in detail embodiments of the invention examples of which are illustrated in the accompanying drawings.

Figure 1:
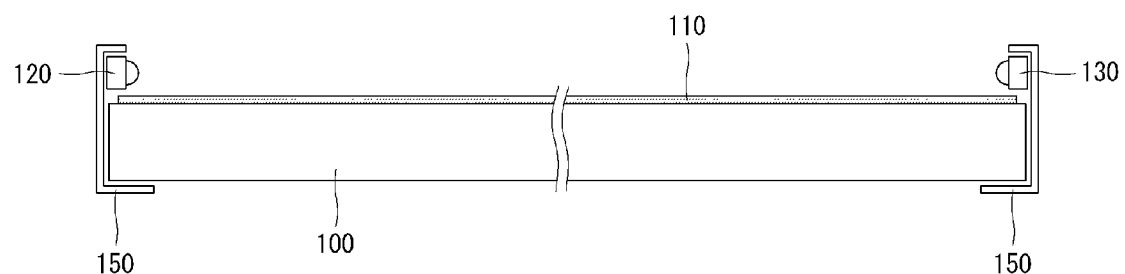
FIGS. 1 and 2 are views for explaining the configuration of a touch panel according to an exemplary embodiment of the present invention.
Figure 2:
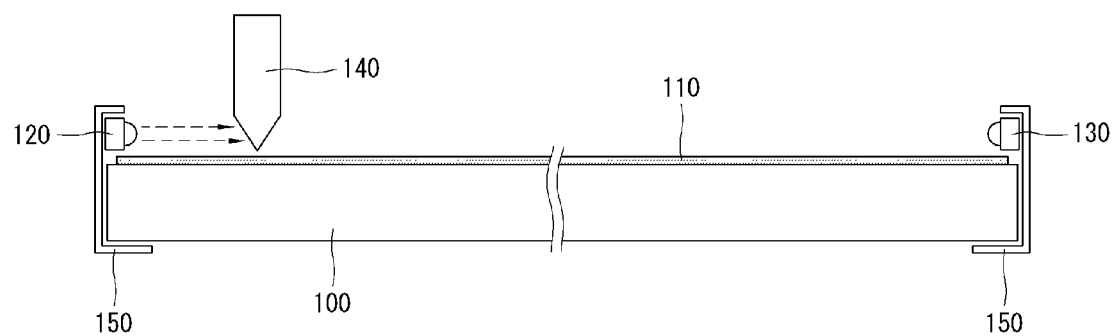

FIGS. 1 and 2 are views for explaining the configuration of a touch panel according to an exemplary embodiment of the present invention.

As shown in FIG. 1, a touch panel according to an exemplary embodiment of the present invention may include a substrate 100, a light emitting element 120 and a light receiving element 130.

The substrate 100 may be required to be substantially transparent for a light transmission, and required to have a support force to support the light emitting element 120 and the light receiving element 130. Thus, the substrate 100 may be a film substrate or a glass substrate. Also, the substrate may be a plastic substrate.

In FIG. 1, a case in which the light emitting element 120 and the light receiving element 130 are disposed on the substrate 100 is illustrated, but alternatively, the substrate 100 may be omitted and the light emitting element 120 and the light receiving element 130 may be disposed on a display panel (not shown). In this case, the display panel serves as the substrate 100. This will now be described in detail.

A protection layer 110 may be additionally disposed on the substrate 100. The protection layer 110 serves to prevent the substrate 100 from being damaged by pressure, or the like, applied from the exterior. To this end, the protection layer 110 may include a glass material or a resin material.

The protection layer 110 may be disposed on the substrate by laminating a protection film in the form of a film on the surface of the substrate 100.

The light emitting element 120 and the light receiving element 130 may be disposed at edges of the substrate 100.

The light emitting element 120 may emit certain beams, e.g., an infrared beam, a visible Light beam, a micro-wave beam, an acoustic-wave beam, a vibration-wave beam, or the like. An element that emits at least one of the beams will be referred to as the light emitting element 120.

The light receiving element 130 may receive the beam emitted by the light emitting element 120.

Although not shown, the touch panel according to an exemplary embodiment of the present invention may further include a controller for calculating a position of a point selected by a user, and further include a cable (not shown) connecting the controller to at least one of the light emitting element 120 and the light receiving element 130.

The operation of the touch panel according to an exemplary embodiment of the present invention will now be described with reference to FIGS. 1 and 2.

When a certain input unit 140, e.g., a pen, a user's finger', and the like, is located at a certain point of the substrate 100, the input unit 140 may block the beam emitted from the light emitting element 120 at the corresponding point.

Then, the beam emitted from the light emitting element 120 may not reach the light receiving element 130. In this case, the controller (not shown) may check the light receiving element 130 disposed at the position corresponding to the beam-blocked portion to thus calculate the position of the point where the input unit 140 is positioned, namely, the position of the touched point.

A protection cover 150 may be disposed on the fringe of the light emitting element 120 and the light receiving element 130. The protection cover 150 may block light made incident from the exterior to prevent malfunction of the light receiving element 130.

FIGS. 3 to 17 are views for explaining the touch panel in detail according to an exemplary embodiment of the present invention. Hereinafter, in order to help understand the present invention, the light emitting element 120 is illustrated to have a triangular shape and the light receiving element 130 is illustrated to have a circular shape. Also, hereinafter, the light emitting element 120 and the light receiving element 130 are illustrated to be disposed on the fringe of the substrate 100, but the present invention is not limited thereto and the light emitting element 120 and the light receiving element 130 may be disposed at an area where they overlap with the substrate 100. In FIG. 3, 300, 310, 320, and 330 are partial areas of the substrate 100.

Figure 3:
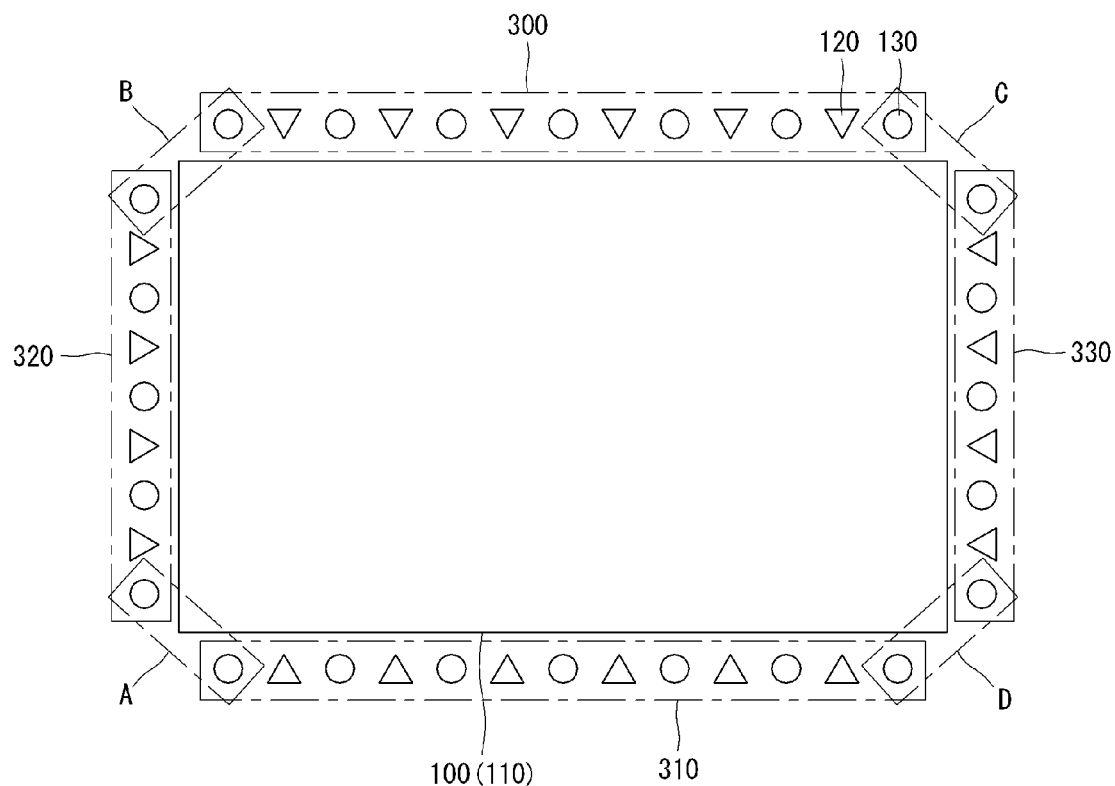
FIGS. 3 to 17 are views for explaining the touch panel in detail according to an exemplary embodiment of the present invention.
Figure 4:
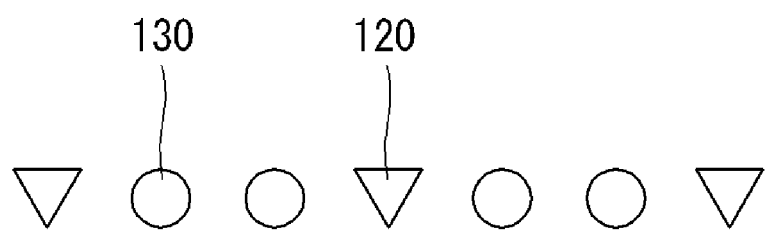

With reference to FIG. 3, the light receiving elements 130 and the light emitting elements 120 may be disposed by turns. Namely, the light receiving elements 130 and the light emitting elements 120 may be alternately disposed.

Preferably, as shown in FIG. 3, the light receiving elements 130 and the light emitting elements 120 may be alternately disposed at a first area 300 of the substrate 100, a second area 310 that faces the first area 300, and third and fourth areas 320 and 330 between the first and second areas 300 and 310.

Preferably, the number of the light receiving elements 100 is larger than that of the light emitting elements 120.

To this end, as shown in FIG. 3, the light receiving elements 130 may be disposed at both ends of the first to fourth areas 300 to 330 of the substrate 100. Because the light receiving elements 130 are disposed at both ends of the first to fourth areas 300 to 330 of the substrate 100, a touch at the corner portions of the substrate 100 can be more precisely detected, thus improving the degree of precision of the touch panel.

When the light receiving elements 130 are disposed at both ends of the first to fourth areas 300 to 330 of the substrate 100, the light receiving elements 130 may be continuously disposed between two adjacent areas. For example, two light receiving elements 130 are continuously disposed like B between the first and third areas 300 and 320 of the substrate 100, two light receiving elements 130 are continuously disposed like C between the first and fourth areas 300 and 330 of the substrate 100, two light receiving elements 130 are continuously disposed like A between the second and third areas 310 and 320 of the substrate 100, and two light receiving elements 130 are continuously disposed like B between the second and fourth areas 310 and 330 of the substrate 100.

Alternatively, in order to have a larger number of the light receiving elements 130 than that of the light emitting elements 120, a plurality of light receiving elements 130 may be disposed between two light emitting elements 120. In this case, at least two light receiving elements 130 may be continuously disposed.

Also, although not shown, under the condition that the number of the light receiving elements 130 is larger than the light emitting elements 120, two light emitting elements 120 may be continuously disposed.

When the touch panel according to an exemplary embodiment of the present invention is driven, the plurality of light emitting elements 120 may be sequentially turned on. Here, the fact that the light emitting elements 120 are turned on means that the light emitting elements 120 emit a certain beam, respectively. In addition, the fact that the light receiving elements 130 are turned on may mean that the light receiving elements 130 are activated. A touched position may be detected according to whether or not the activated light receiving elements 130 receive beams. Also, the fact that the light receiving elements 130 are turned off may mean that the light receiving elements 130 are not activated, and whether or not beams are received by the light receiving elements 130 in an OFF state may not be taken into consideration to detect a touched position.

Figure 5:
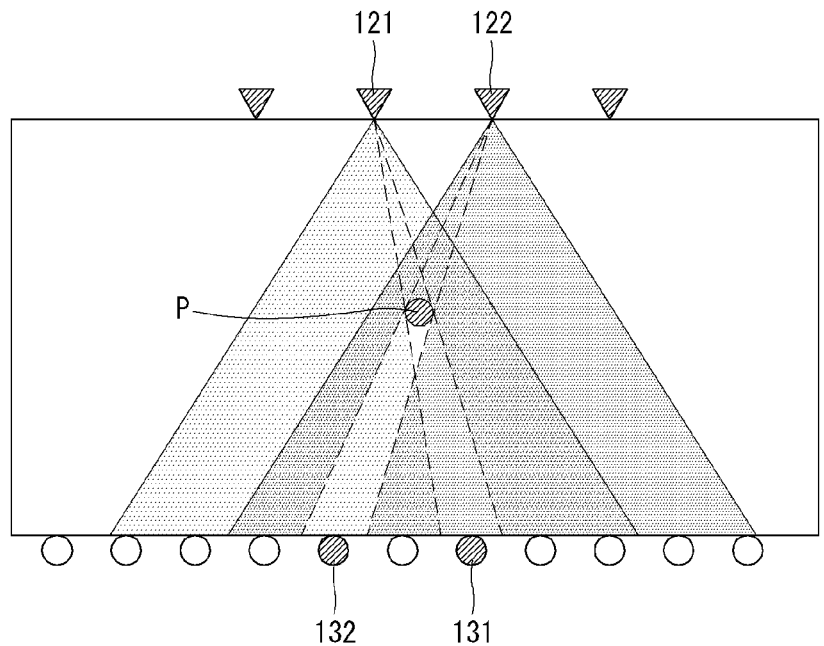

For example, when the input unit is placed at a particular position (P) as shown in FIG. 5, a beam emitted as a first light emitting element 121, among the plurality of light emitting elements 130, is turned on may be blocked at the particular position (P). Then, a first light receiving element 131, among the plurality of light receiving elements 130, cannot receive the beam emitted by the first light emitting element 121. Hereinafter, in order to help understand the present invention, a case in which the light emitting elements 120 and the light receiving elements 130 are disposed at different areas of the substrate 100 will be taken as an example in the following description.

When a second light emitting element 122, among the plurality of light emitting elements 120, is turned on, a beam emitted by the second light emitting element may be blocked at a particular position (P), and a second light receiving element 132, among the plurality of light receiving elements 130, cannot receive the beam emitted by the second light emitting element 122.

Here, the coordinates of the particular position (P), where the input unit is positioned, may be obtained as data of the positions of the first light emitting element 121 and the first light receiving element 131 and the second light emitting element 122 and the second light receiving element 132.

Meanwhile, a case in which the number of the light emitting elements 120 is larger than or equal to the number of the light receiving elements 130 will now be described with reference to FIG. 6.

Figure 6:
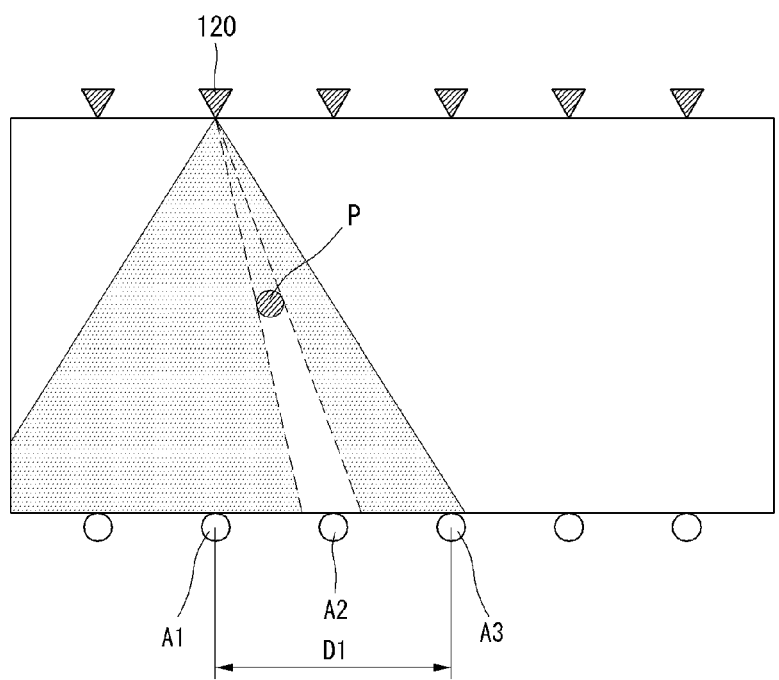

As shown in FIG. 6, when a certain light emitting element 120 emits a beam, a second light receiving element A2, among the plurality of light receiving elements 130, may fail to receive the beam emitted by the light emitting element 120. Meanwhile, the first and third light receiving elements A1 and A3 adjacent to the second light receiving element A2 may receive the beam emitted by the light emitting element 120.

In this case, it may be estimated that a particular position (P), namely, a touched position, where the input unit is placed, may be between the first and third light receiving elements A1 and A3 spaced apart by an interval D1.

Figure 7:
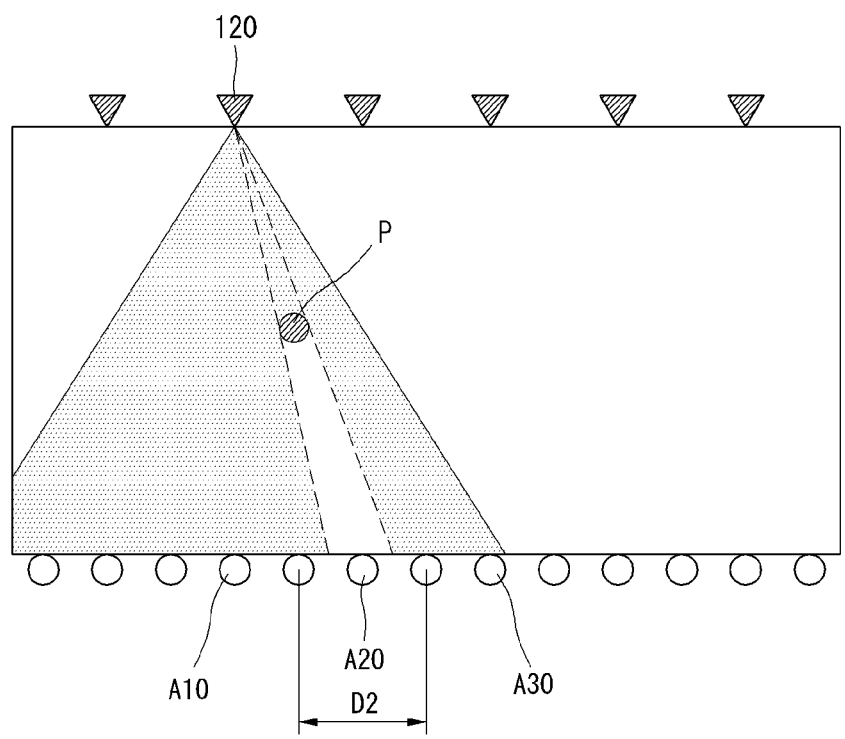

Meanwhile, as shown in FIG. 7, when the number of the light receiving elements 130 is larger than that of the light emitting elements 120 and a certain light emitting element 120 emits light, twentieth light receiving element A20, among the plurality of activated light receiving elements 130, may fail to receive the beam emitted from the light emitting element 120 while the tenth light receiving element A10 and the thirtieth light receiving element A30 adjacent to the twentieth light receiving element A20 may receive the beam emitted from the light emitting element 120.

In such a case, it may be estimated that a particular position (P) where the input unit is placed, namely, a touched position, is placed at an area between the tenth light receiving element A10 and the thirtieth light receiving element A30 at a distance D2 smaller than the distance D1. Namely, compared with the case of FIG. 6, the degree of precision of estimation of the touched position (P) is higher than that of the case of FIG. 6.

Meanwhile, in order to increase the degree of precision of detecting a touched position, the number of the light receiving elements 130 and the number of the light emitting elements 120 may be increased.

In this case, however, the fabrication cost may be increased due to the increase in the number of the light emitting elements 120. Also, because the plurality of light emitting elements 120 are to be sequentially turned on one by one in driving the touch panel, the increase in the number of the light emitting elements 120 would increase a time required for calculating a touched position, potentially degrading a reaction speed of the touch panel.

In addition, when the fact that one light emitting element 120 emits a beam at a certain angle is taken into consideration, although the number of the light emitting elements is increased, the effect of the enhancement of the degree of precision with respect to detection of a touched position may be slight.

Thus, it may be preferred to increase the number of light receiving elements 130, compared with the number of the light emitting elements 120, in order to reduce the fabrication unit cost, improve a reaction speed, and improve the degree of precision in detecting a touched position.

Figure 8:
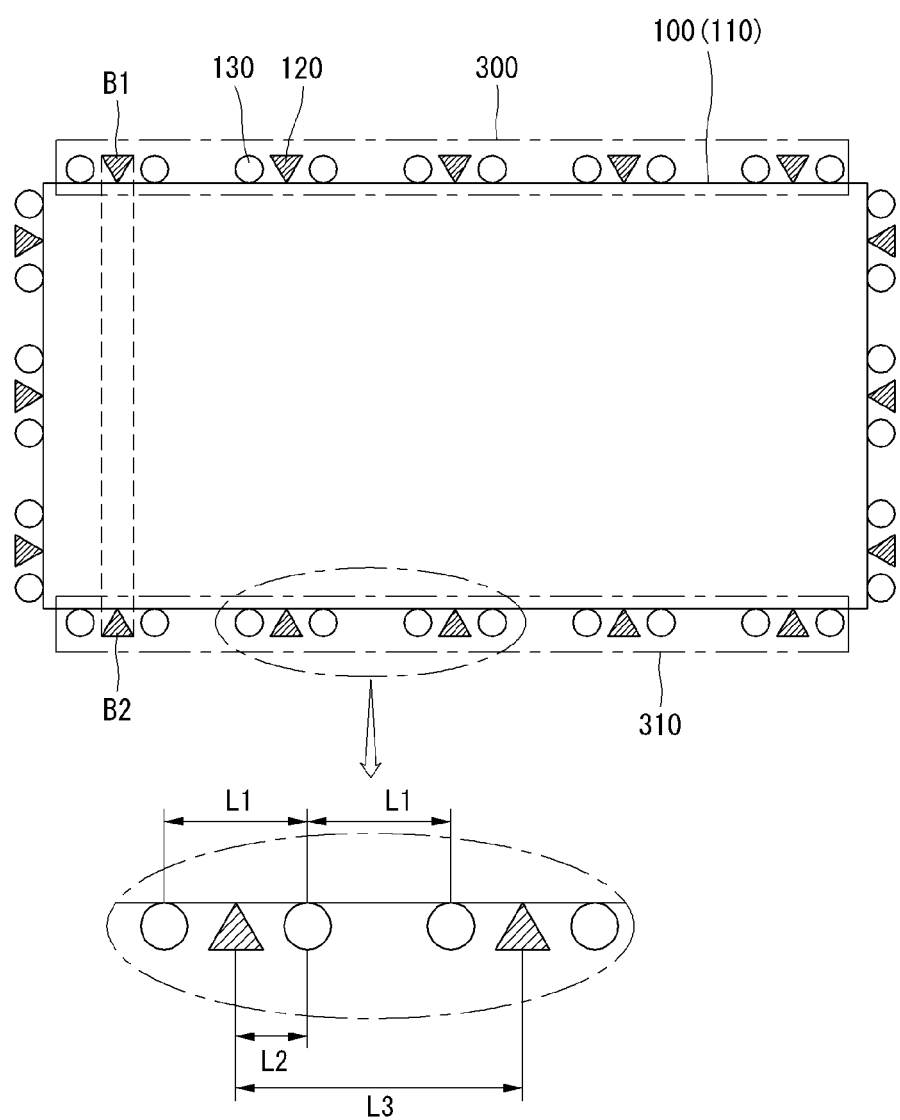

Meanwhile, in order to increase the number of the light receiving elements 130 so as to be larger than the number of light emitting elements 120, as shown in FIG. 8, the light receiving elements 130 and the light emitting elements 120 may be disposed substantially at equal intervals and the light emitting element 120 is disposed between two light receiving elements 130.

In this case, the space L1 between two continuously disposed light receiving elements 130 may be larger than the shortest space L2 between a certain light emitting element 120 and the light receiving element 130.

Also, the space L1 between the two adjacent light receiving elements 30 may be smaller than the space L3 between two adjacent light emitting elements 120.

Two certain light emitting elements 120 may be disposed such that they correspond to each other. For example, as shown in FIG. 8, a first light emitting element B1 disposed at a first area 300 of the substrate 100 and a second light emitting element B2 disposed at a second area 310 that faces the first area 300 of the substrate 100 may overlap with each other in a direction perpendicular to the first and second areas 300 and 310.

Alternatively, two certain light emitting elements 120 may be disposed in a crisscross manner. For example, an extending line E1, perpendicular to at least one substrate 100, from at least one of the plurality of light emitting elements 120 may correspond to an area between two adjacent light receiving elements 130.

Figure 9:
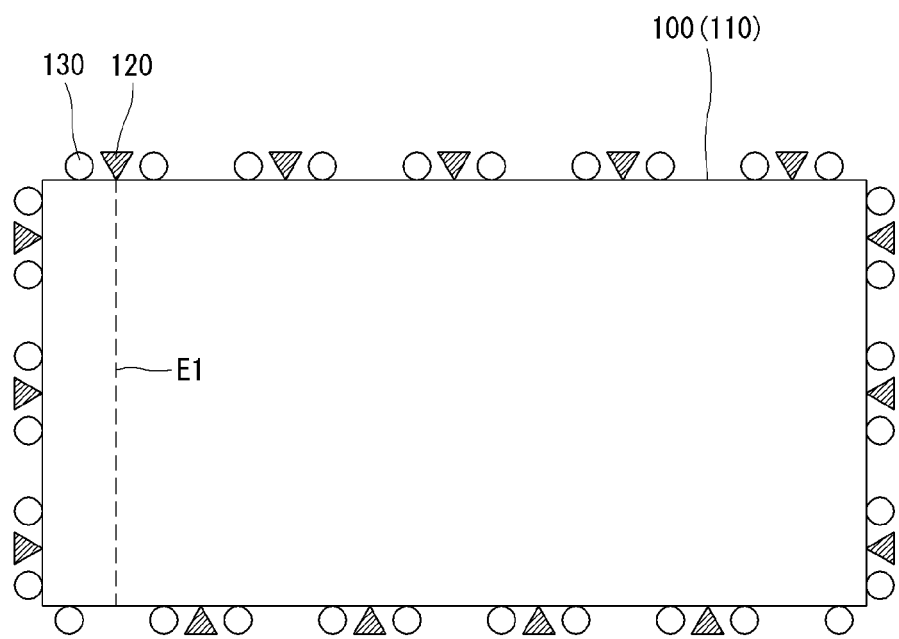

In the touch panel according to an exemplary embodiment of the present invention, because a beam emitted by one light emitting element 120 can be received by a plurality of light receiving elements 130, as shown in FIGS. 8 and 9, the light emitting elements 120 and the light receiving elements 130 do not need to be aligned.

The reason for disposing the light emitting element 120 between two certain light receiving elements 130 will now be described with reference to FIGS. 10 and 11.

Figure 10:
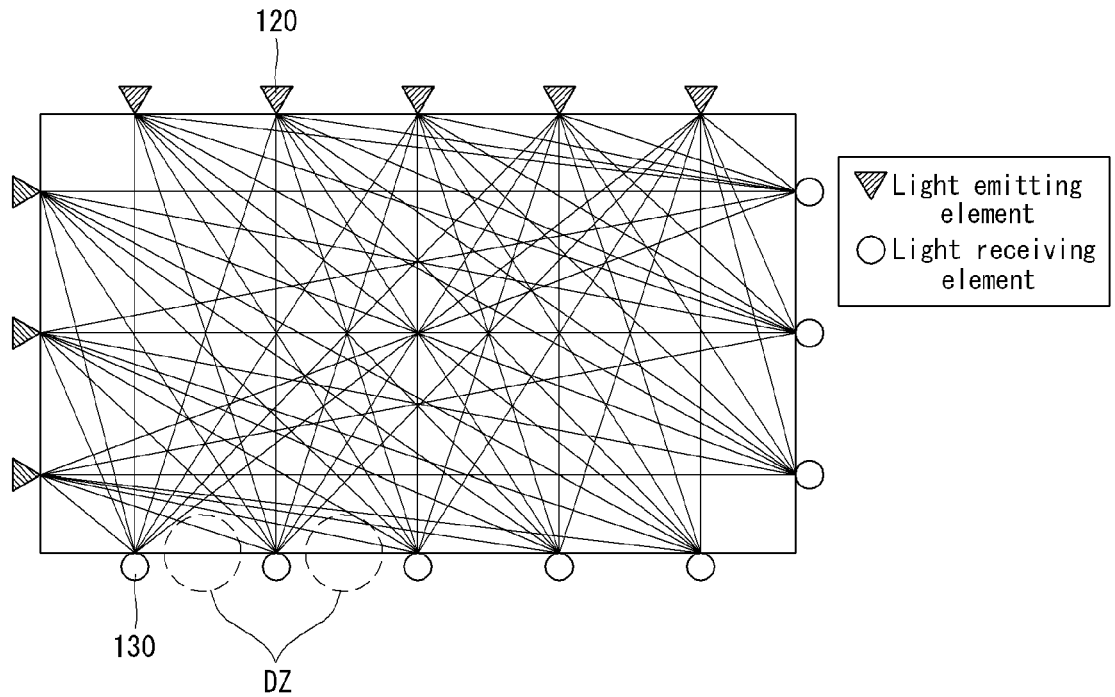

With reference to FIG. 10, for example, light emitting elements 120 are continuously disposed at a certain area of the substrate 100 and light receiving elements 130 are continuously disposed at another area.

In such a case, beams emitted by the light emitting elements 120 disposed at the certain area of the substrate 100 are received by the light receiving elements 130 disposed at another area of the substrate 100, so it may be difficult to detect whether or not an area DC between the light receiving elements 130 is touched. The area in which it is difficult to detect whether or not it is touched may be called a dead zone (DZ).

Figure 11:
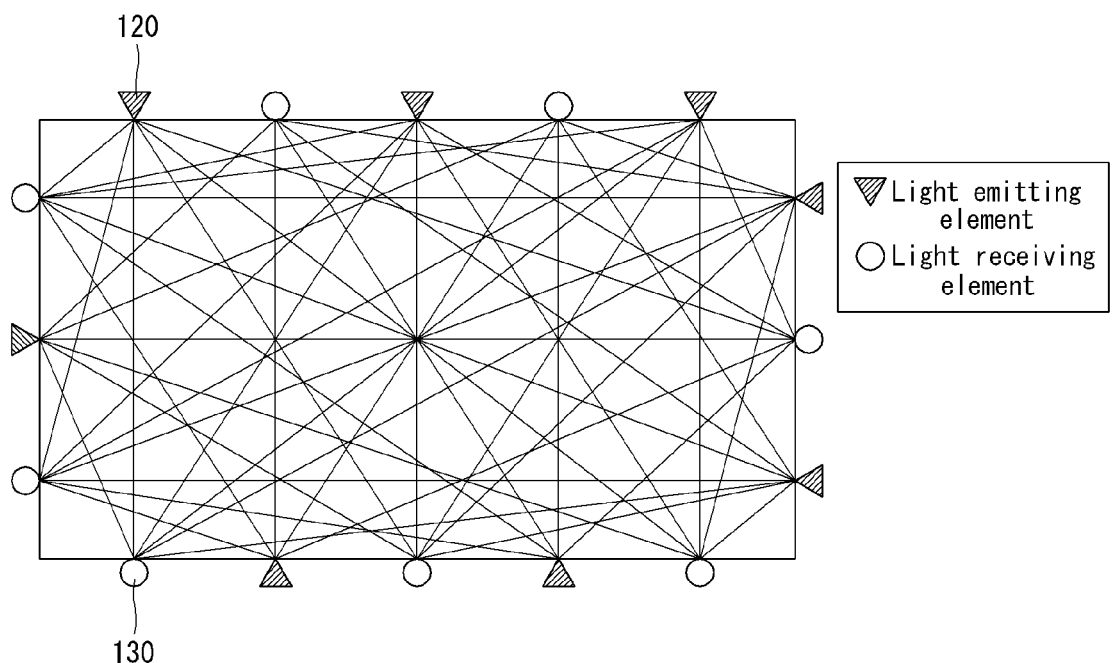

Meanwhile, when the light emitting element 120 is disposed between two light receiving elements 130 as shown In FIG. 11, the size of the dead zone DZ can be reduced. Thus, the degree of precision of the touch panel can be improved.

Meanwhile, in the touch panel according to an exemplary embodiment of the present invention, abeam radiation angle of the light emitting element 120 can be adjusted.

For example, it is assumed that a certain first light emitting element 121 emits a beam substantially at an angle of θ2.

In such a case, the beam emitted by the first light emitting element 121 may proceed with areas S1, S2, and S3, and accordingly, the light receiving elements 130 a to j disposed at one area of the substrate 100 may receive the bam emitted by the first light emitting element 121.

Here, as for the light receiving elements c and j, the space between the light receiving element j 130 and the first light emitting element 121 is larger than that between the light receiving element c 130 and the first light emitting element 121. Accordingly, the sensitivity of the light receiving element j 130 with respect to the beam emitted by the first light emitting element 121 may be lower than that of the light receiving element c 130. Thus, even when a touch is not generated at the area S3, the possibility that the light receiving element j 130 will not receive the beam emitted by the first light emitting element 121 is higher than that of the light receiving element c 130, and accordingly, it would be possibly recognized such that a touch has been generated at the area S3 although it is not, causing malfunction of the touch panel.

Meanwhile, in the touch panel according to an exemplary embodiment of the present invention, although the light receiving elements 130 a to j are within the light reception range of the beam emitted by the first light emitting element 121, but the light receiving elements 130 f to j having a lower sensitivity to the beam emitted from the first light emitting element 121 than that of the light receiving elements a to e may be turned off. Namely, when the first light emitting element 121 is turned on, the light receiving elements 130 form a to e are activated, while the light receiving elements if to j are not activated. In other words, a radiation angle of the first light emitting element 121 is regulated to be θ1 smaller than θ2.

Or, some of the plurality of light receiving elements 130 positioned within the light radiation range of a certain light emitting element 130 may be turned on while the other remaining light receiving elements may be turned off.

Figure 12:
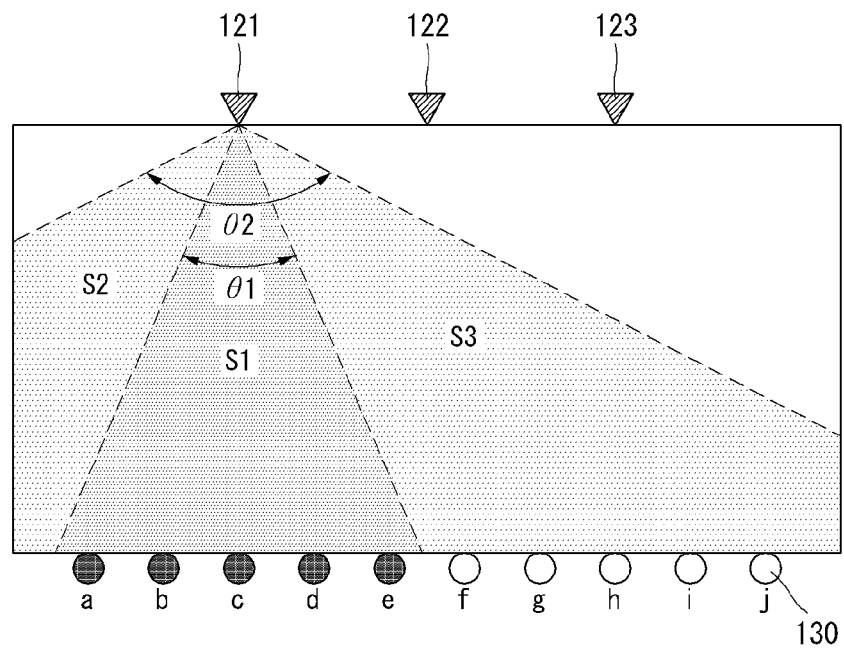

For example, in FIG. 12, the first light emitting element 121 may emit light at a radiation angle of θ2. In this case, the light receiving elements 130 a to j may come within the light radiation range of the first light emitting element 121.

Here, among the light receiving elements 130 a to j positioned within the light radiation range of the first light emitting element 121, the light receiving elements 130 a to e may be turned on and the light receiving elements 130 f to j may be turned off.

In other words, at least one light receiving element 130 positioned within the light radiation range of the certain light emitting element 120 positioned at the first area of the substrate may be turned on. Here, the light receiving elements 130 corresponding to the certain light emitting element 120 positioned at the first area of the substrate may be positioned at least at the second area facing the first area of the substrate.

The distance between the first light emitting element 121 disposed at the first area of the substrate and the light receiving elements 130 disposed at the second area of the substrate activated correspondingly according to the first light emitting element 121 may be shorter than the distance between the first light emitting element 121 and the light receiving elements 130 which are not activated according to the first light emitting element 121.

For example, the distance between the light receiving elements 130 a to e which are turned on correspondingly according to the first light emitting element 121, among the light receiving elements 130 a to j disposed at the second area, may be shorter than the distance between the other remaining light receiving elements 130, namely, the light receiving elements 130 f to j turned off correspondingly according to the first light emitting element 121.

Namely, the light receiving elements 130 a to e may be disposed to be closer to the first light emitting element 121 compared with the light receiving elements 130 f to j.

Also, the distance between the light receiving element c 130, among the light receiving elements 130 a to e, may be shorter than the distance between the other light receiving elements 130 and the first light emitting element 121. Namely, the distance between the light receiving element c 130 and the first light emitting element 121 is the shortest.

If only the light receiving element c 130 is turned on correspondingly according to the first light emitting element 121, it may be considered that one light receiving element 130 closest to the first light emitting element 121, among the plurality of light receiving elements 130, namely, only the light receiving element c 130, is activated.

Or, only a central light receiving element 130 among three certain light receiving elements 130 dispose abreast may be activated in order to reliably prevent malfunction of the touch panel.

Figure 13:
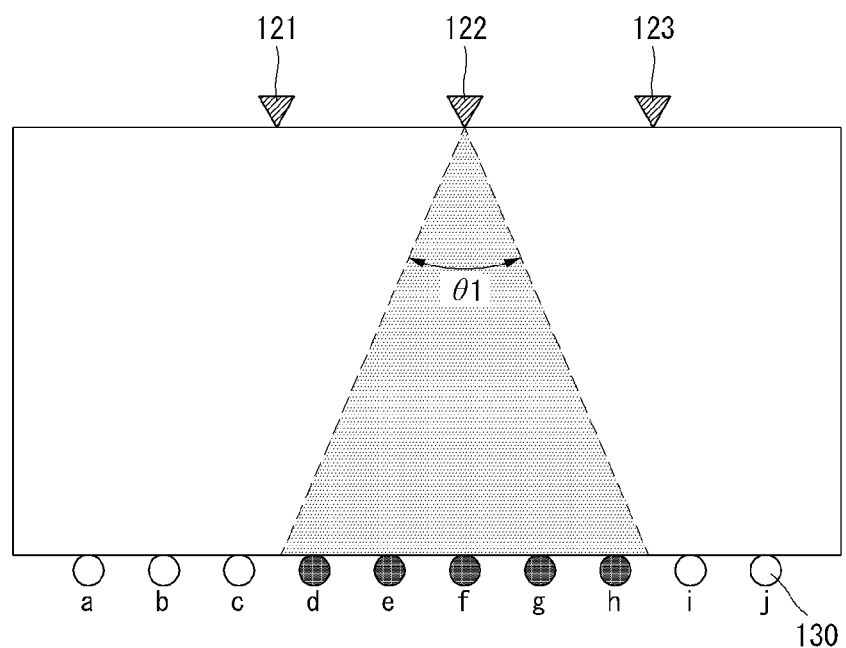

For example, as shown in FIG. 13, when the second light emitting element 120, among the light emitting elements 1200, emits a beam, the light receiving elements 130 a to c and the light receiving elements 130 i and j, among the light receiving elements 130 a to j, may be turned off, while the light receiving elements 130 d to h disposed between the light receiving elements 130 c and i may be turned on.

In other words, at least one light receiving element 130 positioned within a light irradiation range of the certain light emitting element 120 is turned on, and light receiving elements 130 positioned to be out of the light radiation range of the certain light emitting element 120 may be turned off.

In addition, in order to enhance a touch detection efficiency, at least three light receiving elements 130 positioned within the light radiation range of the certain light emitting element 120 may be turned on. When the at least three light receiving elements 130 are activated correspondingly according to one light emitting element 120, a touch of a relatively large object can be easily detected, and a touched position of the relatively large object can be easily detected.

Figure 14:
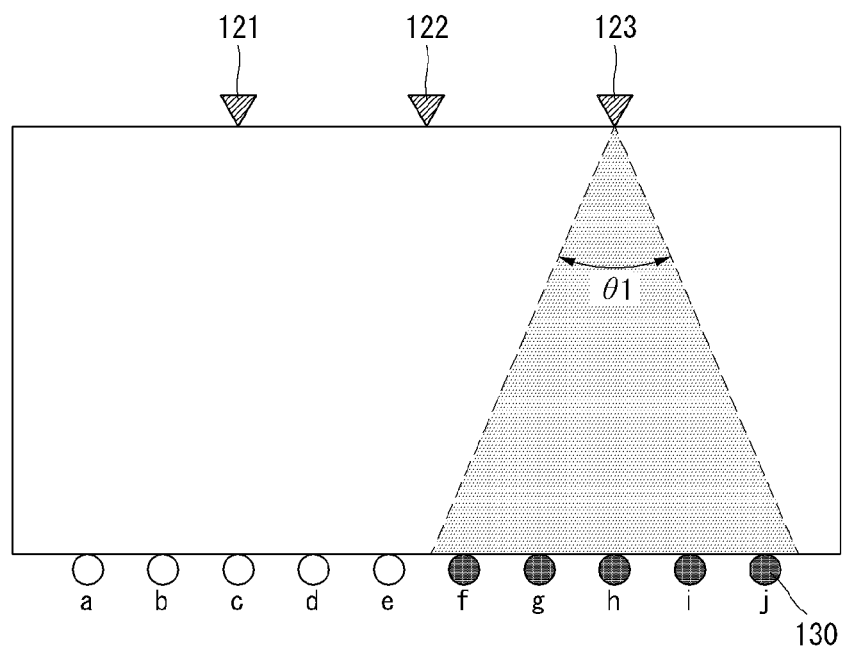

The case illustrated in FIG. 14 is similar to the case illustrated in FIG. 12, so a detailed description thereof will be omitted.

Meanwhile, the number of light receiving elements 130 activated correspondingly according to one light emitting element 120 may be adjusted to be different.

Figure 15:
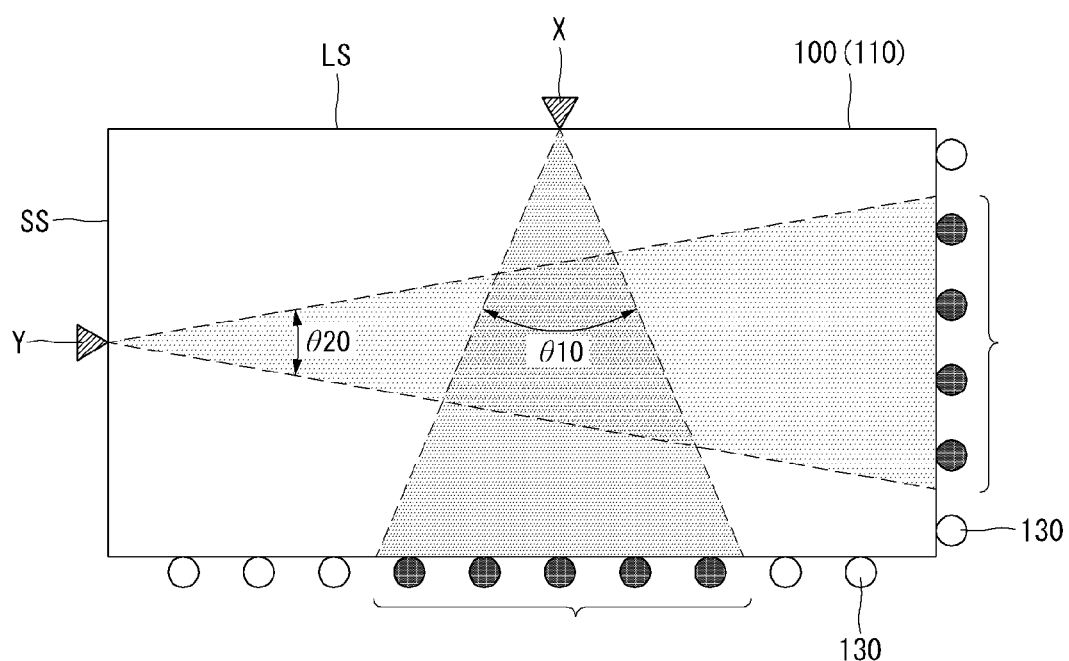

For example, as shown in FIG. 15, the number of light receiving elements 130 (i.e., five light receiving elements) turned on correspondingly according to a first light emitting element X disposed at a longer side LS of the substrate 100 and the number of light receiving elements 130 (i.e., four light receiving elements) turned on correspondingly according to a second light emitting element Y disposed at a shorter side SS of the substrate 100 may be different. Preferably, the number of the light receiving elements 130 turned on correspondingly according to the first light emitting element X may be larger than the number of light receiving elements 130 turned on correspondingly according to the second light emitting element Y.

Because the first light emitting element X is disposed at the longer side LS of the substrate 100, the distance between the first light emitting element X and the light receiving element 130 that receives a beam emitted by the first light emitting element X is relatively short. Meanwhile, because the second light emitting element Y is disposed at the shorter side (SS0 of the substrate 100, the distance between the second light emitting element Y and the light receiving element 130 that receives a beam emitted by the second light emitting element Y is relatively long.

Accordingly, although a radiation angle θ10 of the first light emitting element X is larger than a radiation angle θ20 of the second light emitting element Y, the sensitivity of the light receiving elements 130 to the beam emitted by the first light emitting element X may not be degraded.

In this manner, the number of activated light receiving elements may be adjusted to be different by regulating the radiation angle of certain two light emitting elements 120.

Figure 16A:
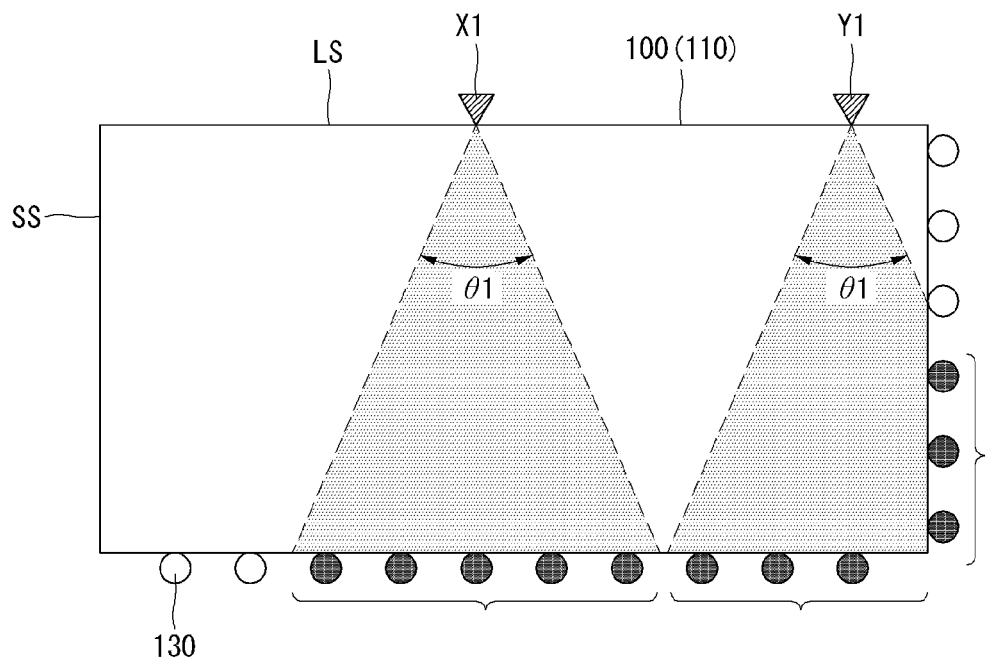
Figure 16B:
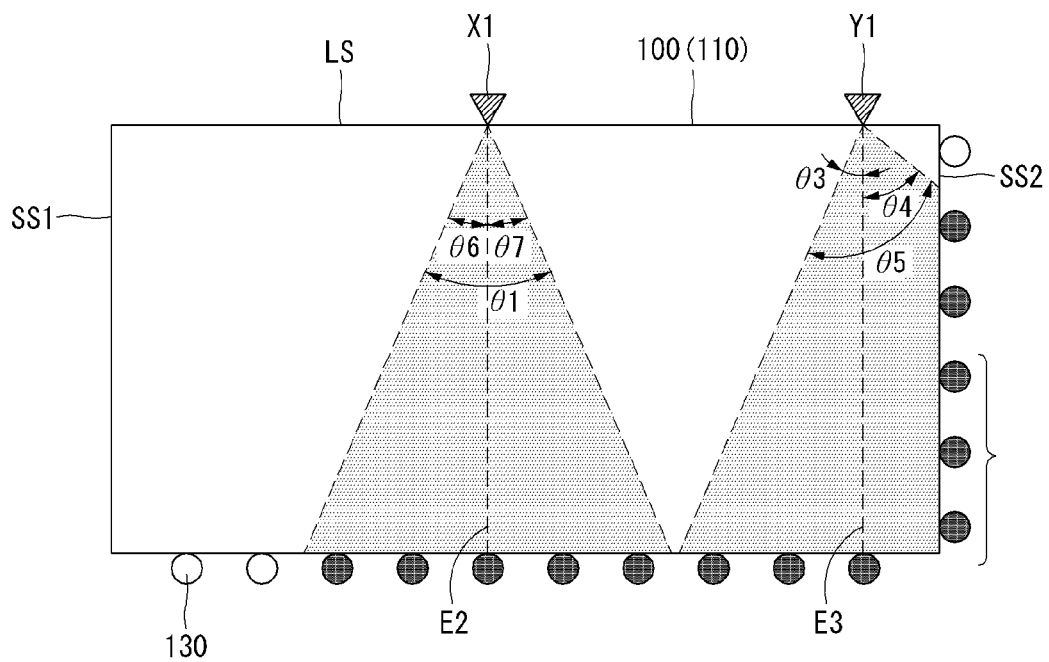

Alternatively, as shown in FIGS. 16a and 16b, the number of activated light receiving elements 130 may be adjusted to be different without having to change the radiation angle of the light emitting element 120.

For example, the number of light receiving elements 130 activated correspondingly according to first and second light emitting elements X1 and Y1 disposed to be abreast at the same area of the substrate 100 may be adjusted to be substantially different.

Preferably, the number of light receiving elements 130 turned on correspondingly according to the second light emitting element Y1 disposed to be closer to the shorter side SS of the substrate 100 may be greater than the number of light receiving elements 130 turned on correspondingly according to the first light emitting element X1.

Because the second light emitting element Y1 is disposed to be adjacent to the shorter side SS of the substrate 100, the distance between the second light emitting element Y1 and the light receiving elements 130 disposed at the shorter side SS of the substrate 100 is relatively short compared with the first light emitting element X1.

Accordingly, although the radiation angle θ1 of the first and second light emitting elements X1 and Y1 are substantially the same, the number of the light receiving elements turned on correspondingly according to the second light emitting element Y1 may be larger.

Or, as shown in FIG. 16, a radiation angle θ5 of the second light emitting element Y1 disposed to be closer to the shorter side SS of the substrate 100 may be relatively large compared with the first light emitting element X1.

In detail, because the second light emitting element Y1 is disposed to be adjacent to the shorter side SS of the substrate 100, and accordingly, the distance between the second light emitting element Y1 and the light receiving elements 130 disposed at the shorter side SS of the substrate 100 is relatively small compared with the first light emitting element X1. Thus, a radiation angle θ4 in the direction of the shorter side SS of the substrate 100 adjacent to the second light emitting element Y1 can be adjusted to be larger than that of the first light emitting element X1.

When an extending line E2 of the first light emitting element X1 is set in the direction perpendicular to the longer side LS of the substrate 100 and if it is assumed that a radiation angel of the first light emitting element X1 toward a first shorter side SS1 of the substrate 100 from the extending line E2 is θ6 and a radiation angle of the first light emitting element X1 toward a second shorter side SS2 of the substrate 100 from the extending line E2 is θ7, the sum of θ6 and θ7 may be a total radiation angle θ1 of the first light emitting element X1.

In addition, when an extending line E3 of the second light emitting element Y1 is set in a direction perpendicular to the longer side LS of the substrate 100 and if it is assumed that a radiation angle of the second light emitting element Y1 toward the first shorter side SS1 of the substrate 100 from the extending line E3 is θ3 and a radiation angle of the second light emitting element Y1 toward the second shorter side SS2 of the substrate 100 from the extending line E3 is θ4, the sum of the radiation angles θ3 and θ4 may be a total radiation angle θ5 of the second light emitting element Y1.

Here, radiation angles θ3 and θ6 may be substantially the same. Meanwhile, the radiation angle θ4 may be greater than the radiation angle θ7.

Thus, although the radiation angle θ4 is greater than the radiation angle θ7, because the second light emitting element Y1 is disposed to be adjacent to the second shorter side SS2 of the substrate 100, the distance between the second light emitting element Y1 and the light receiving elements 130 disposed at the second shorter side SS2 is relatively short compared with the first light emitting element X1, and accordingly, the sensitivity of the light receiving elements 130 disposed at the second shorter side SS2 of the substrate 100 to the beam emitted by the second light emitting element Y1 may be sufficiently high.

In FIG. 16B, the second light emitting element Y1 may be positioned at an outer fringe or an end of the first area of the substrate. Meanwhile, the first light emitting element X1 may be positioned at a central portion of the first area of the substrate compared with the second light emitting element Y1. In consideration of this, the first light emitting element X1 may be called a central light emitting element and the second light emitting element Y1 may be an outer light emitting element.

In this manner, the number of the light receiving elements turned on correspondingly according to the second light emitting element Y1 positioned at an outer fringe or an end of the first area of the substrate and the number of light receiving elements 130 turned on correspondingly according to the first light emitting element X1 positioned at a central portion of the first area may be different.

For example, as shown in FIG. 16B, the number of light receiving elements 130 turned on correspondingly according to the second light emitting element Y1 is 8, which is greater than the number of light receiving elements (five light receiving elements) turned on correspondingly according to the first light emitting element X1.

In addition, as shown in FIG. 16B, the radiation angle Q5 of the second light emitting element Y1 may be greater than the radiation angle θ1 of the first light emitting element X1.

The radiation angle of the light emitting element 120 as described above may be automatically regulated according to the intensity of beams detected by the respective light receiving elements 130 with respect to a certain light emitting element 120. For example, in a state in which a certain light emitting element 120 is turned on in a radiation angle regulation module, the intensity of the beams received by the respective light receiving elements 130 may be measured while turning on all the light receiving elements 130 at a time or sequentially.

It may be set such that light receiving elements 130 having a strength of received beams lower than a pre-set threshold value are not activated according to the corresponding light emitting element 120. By using this method, the radiation angle of each of the light emitting elements 120 may not need to be regulated manually.

Meanwhile, in order to enhance the reliability of a touch position detection, preferably, the radiation angle of a single luminance element 120 may be set to be within the range from 30% to 95% of a maximum radiation angle.

Meanwhile, in order to reduce the size of a dead zone, the light receiving elements 130 may be disposed at a farther back side than the light emitting elements 120.

Figure 17:
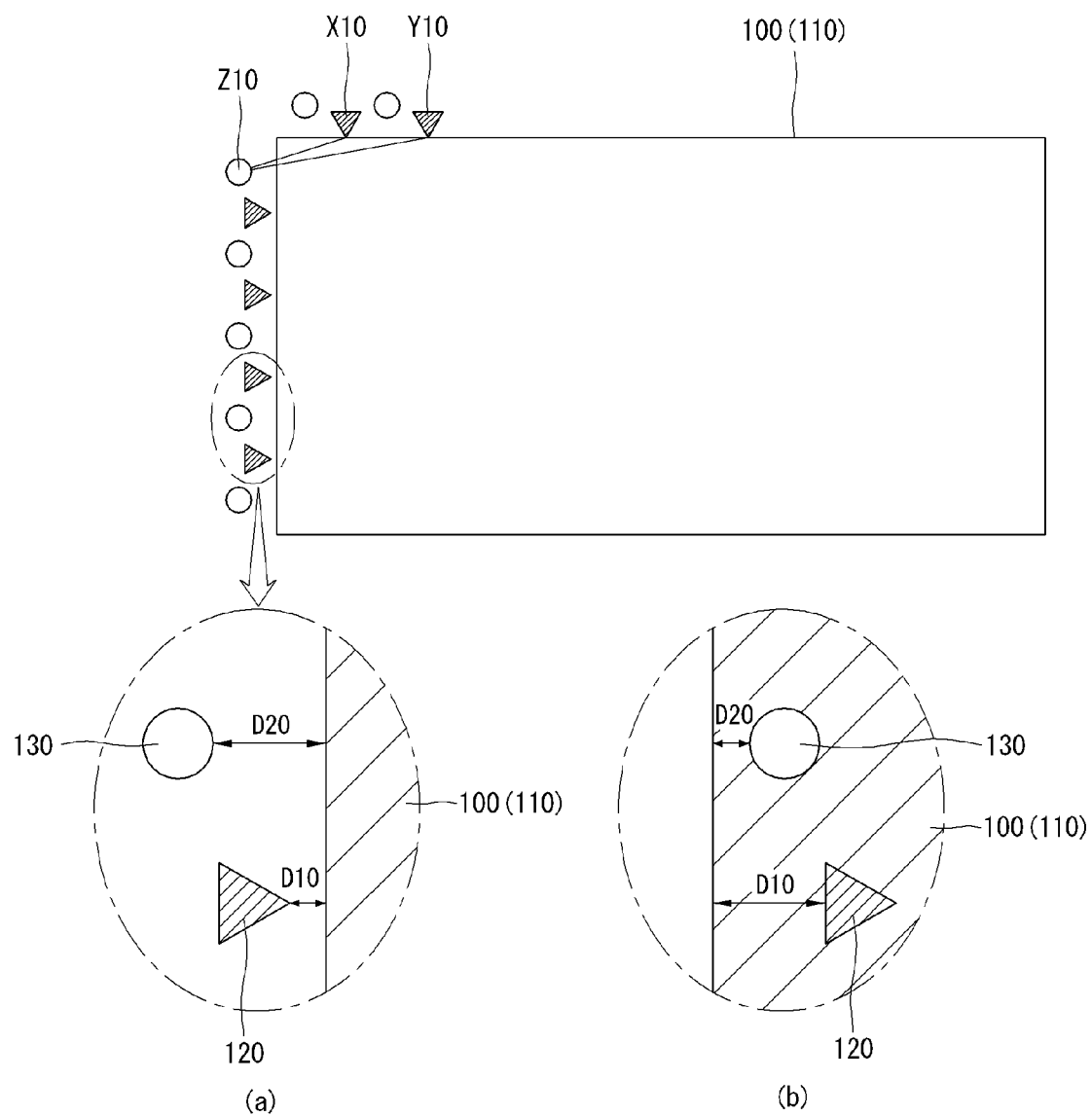

For example, as shown in FIG. 17, the light receiving elements 130 may be disposed at positions farther away from the center of the substrate 100 compared with the light emitting elements 120. Then, beams emitted by the first and second light emitting elements X10 and Y10 disposed at a corner portion of the substrate 100 can be effectively received by the first light receiving element Z10, further reducing the dead zone.

To this end, the space between the end of the substrate and the light receiving element 130 and the space between the end of the substrate 100 and the light emitting element 120 may be different.

For example, as shown in FIG. 17(*a*), when the light emitting element 120 and the light receiving element 130 are disposed at an outer side of the substrate 100, the shortest space D20 between the end of the substrate 100 and the light receiving element 130 may be greater than the shortest space D10 between the end of the substrate 100 and the light emitting element 120. Or, as shown in FIG. 17(*b*), when the light emitting element 120 and the light receiving element 130 are disposed at positions overlapping with the substrate 100, the shortest space D20 between the end of the substrate 100 and the light receiving element 130 may be smaller than the shortest space D10 between the end of the substrate 100 and the light emitting element 120.

Figure 18A:
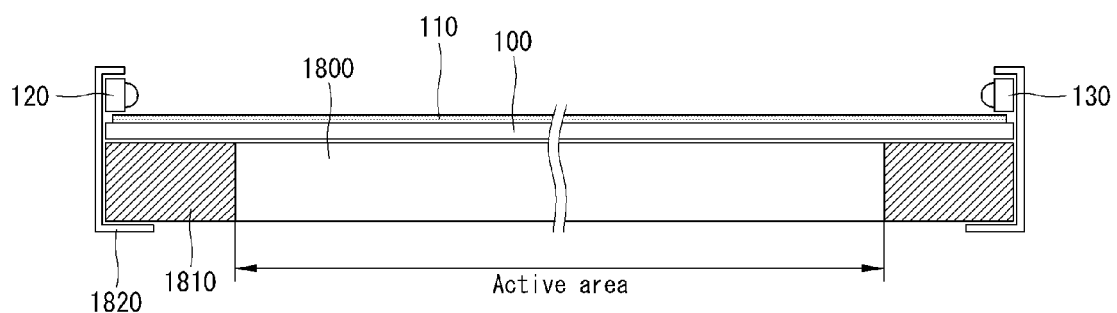
FIGS. 18A, 18B, and 19 are views for explaining a display device including a touch panel according to an exemplary embodiment of the present invention.
Figure 18B:
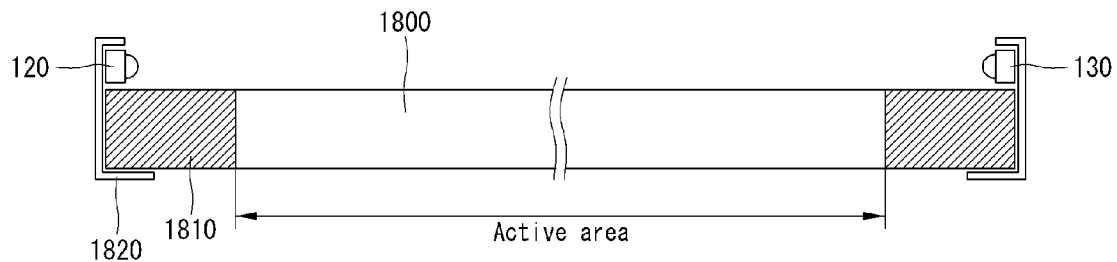
Figure 19:
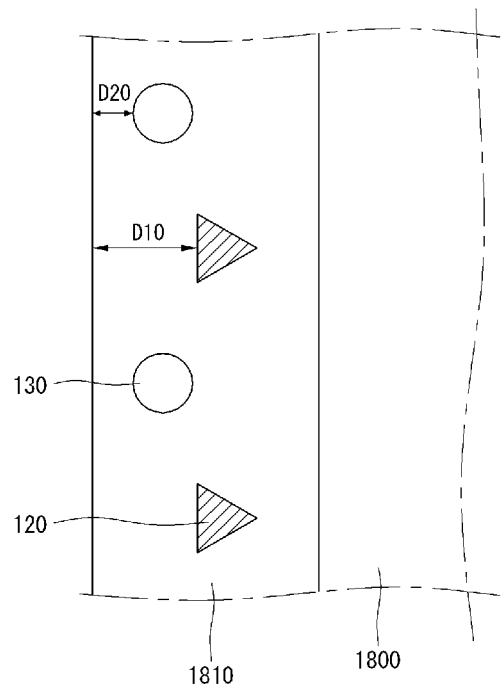

FIGS. 18A, 18B, and 19 are views for explaining a display device including a touch panel according to an exemplary embodiment of the present invention. Hereinafter, a description of a portion which has been already described above in detail will be omitted. As a display panel 1800, various types of display panels such as a plasma display panel, a liquid crystal display (LCD) panel, and the like, may be employed.

With reference to FIG. 18A, the substrate 100 is disposed on a front surface of the display panel 1800, and the plurality of light emitting elements 120 and light receiving elements 130 may be disposed at the edges of the substrate 100.

The positions of the plurality of light emitting elements 120 and the light receiving elements 130 may correspond to an outer fringe of an active area of the display panel 1800 on which an image is displayed.

In such a case, a protection cover 1820 may be installed to cover the sides of the substrate 100 and the display panel 1800 together, and may be used as a fixing unit for fixing the substrate 100 and the display panel 180.

As shown in FIG. 18B, the substrate 100 may be omitted and the plurality of light emitting elements 120 and the plurality of light receiving elements 130 may be disposed at the edge of the display panel 1800.

Preferably, the light emitting element 120 and the light receiving element 130 may be disposed at an outer side of the active area of the display panel 1800 on which an image is displayed. For example, as shown in FIG. 18B, the light emitting element 120 and the light receiving element 130 may be disposed at a bezel area 1820 of an outer side of the active area of the display panel 180. Here, reference numeral 1820 is described as a bezel area, but the reference numeral 1820 may be called a dummy area of the display panel.

The configuration of the touch panel applied to the display device may be substantially the same as that described above in detail with reference to FIGS. 1 to 17, so a detailed description thereof will be omitted.

Also in the display device as shown in FIGS. 18A and 18B, preferably, the light receiving element 130 is disposed at a farther back side than the light emitting element 120 like those as shown in FIG. 17. To this end, the shortest space D20 between the end of the display panel 1800 and the light receiving element 130 may be smaller than the shortest space D10 between the end of the display panel 1800 and the light emitting element 120.

In order to dispose the light receiving element 130 at a farther position from the display panel 1800, a PCB (not shown) may be disposed on the protection cover 1820. When the PCB is disposed on the protection cover 1820 disposed at the side of the display panel 1800, the light receiving element 130 may be substantially displayed at the end of the display panel 1800.

Here, the PCB may have flexibility, namely, it may be a flexible PCB. Also, the PCB may couple a controller (not shown), a light receiving element 130, and a light emitting element 120.

FIGS. 20 to 24 are views for explaining a method for driving a touch panel in detail according to an exemplary embodiment of the present invention.

With reference to FIG. 20, in the method for driving the touch panel according to an exemplary embodiment of the present invention, a plurality of light emitting elements X10 to X14 are sequentially turned on to emit beams (S21), and a plurality of light receiving elements Z1 to Z4 are turned on to receive the beam emitted by the light emitting elements X10 to X14 (S22).

Next, detection data according to the positions of the light emitting elements X10 to X14, which have emitted light, and light reception data of the plurality of light receiving elements Z1 to Z4 turned on correspondingly according to the respective light emitting elements is converted according to a mathematical conversion scheme to acquire a central point of each detection data (S23).

And then, the data regarding the central point may be reversely converted to calculate a touched position (S24).

Figure 20A:
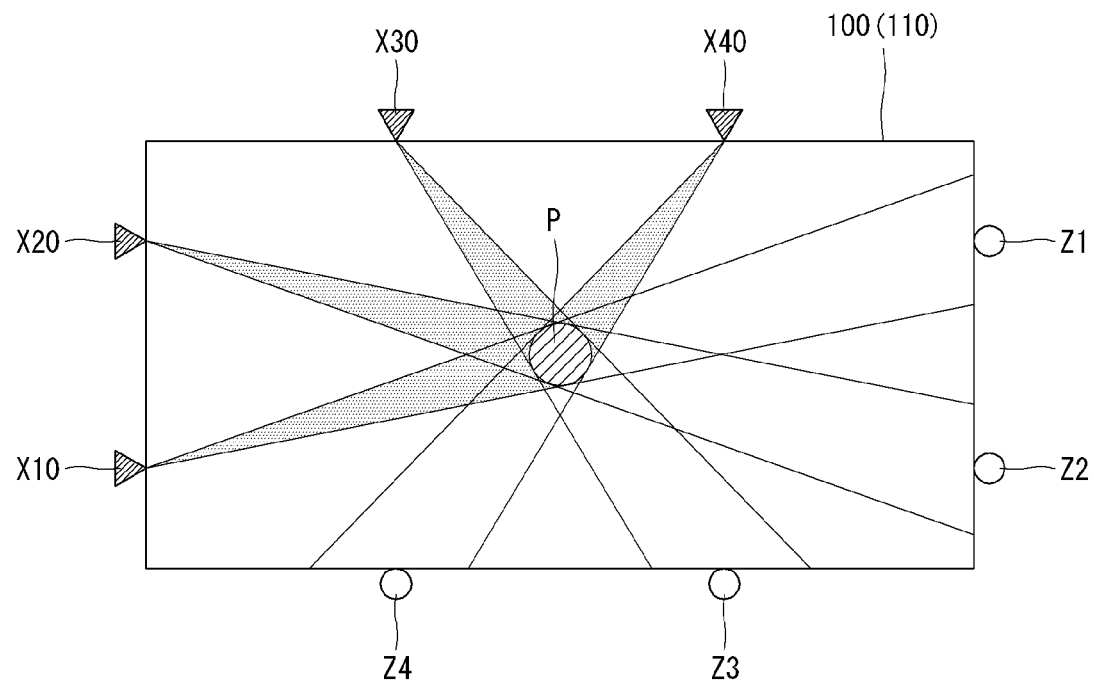
FIGS. 20 to 24 are views for explaining a method for driving a touch panel in detail according to an exemplary embodiment of the present invention.

Here, the detection data includes data regarding the positions of the light emitting elements which have been turned on and the position of a light receiving element which has failed to detect light from the light emitting element among the plurality of light receiving elements turned on correspondingly according to the light emitting elements which have been turned on. For example, as shown in FIG. 20A, when the first light emitting element X10 is turned on, the first light receiving element Z1 cannot receive the beam emitted by the first light emitting element X10 due to an input unit placed at a point P. Thus, the detection data includes orthogonal coordinates data corresponding to (X10, Z1). In this manner, in FIG. 20, the detection data includes orthogonal coordinates data corresponding to (X10, Z1), (X20, Z2), (X30, Z3), (X40, Z4).

Here, in the step of receiving beams by the plurality of light receiving elements Z1 to Z4, the method of turning on a plurality of light receiving elements and turning off the other remaining light receiving elements when the respective light emitting elements X10 to X14 are turned on as described above may be used. It has been described above in detail, so a repeated description thereof will be omitted.

Meanwhile, in the touch panel according to an exemplary embodiment of the present invention, in order to prevent malfunction of the light receiving elements Z1 to Z4 due to light made incident from the exterior or light emitted from the display panel, a driving signal, of which at least one of frequency and amplitude has been regulated, may be used.

Figure 20B:
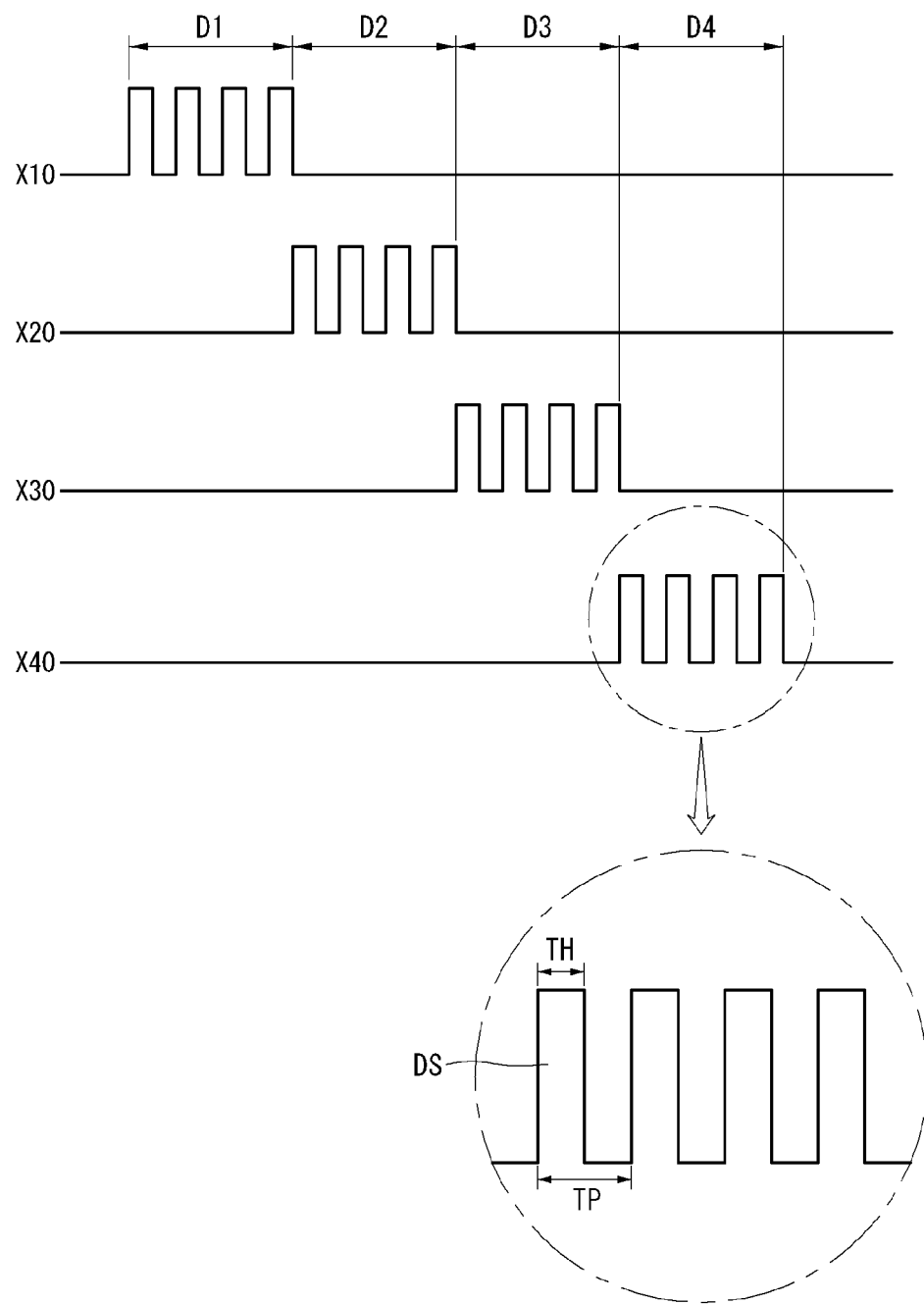
Figure 21:
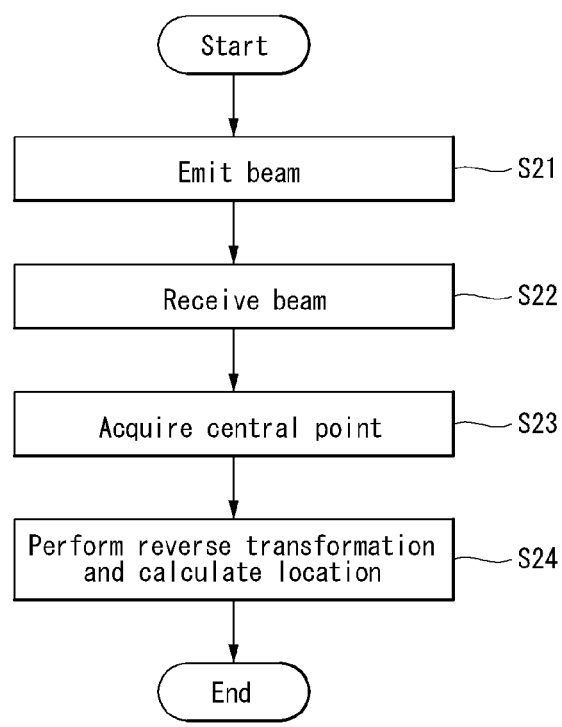

For example, as shown in FIG. 20B, the fourth light emitting element X40, among the plurality of light emitting elements X10 to X40, may be turned on according to a plurality of driving signals DS during a first period P1. In detail, the fourth light emitting element X40 is turned on to emit a beam while the driving signal DS is being supplied during the first period P1, and is turned off during a period between two driving signals DS, not emitting a beam. Namely, light emission cycle of the fourth light emitting element X40 is TP and a unit light emission period is TH.

In this case, the light receiving elements Z1 to Z4 perform sampling at a sampling rate according to the light emission cycle TP and the light emission period TH to recognize light reception when light corresponding to the pattern of the light emission cycle TP and the light emission period TH of the fourth light emitting element X40 is received. In detail, when a light emission cycle TP of the fourth light emitting element X40 is 2 ms and a light emission period TH of the fourth light emitting element X40 is 1 ms, the light receiving elements Z1 to Z4 may recognize light received during 1 ms at the cycle of 2 ms as light which has been emitted by the fourth light emitting element X40 and disregard the other remaining light. For example, when an external observer shines a flashlight toward the plurality of light receiving elements Z1 to Z4 for 10 seconds, the light receiving elements Z1 to Z4 may recognize the light from the flashlight, as noise. Accordingly, the influence of external light can be reduced and a generation of malfunction can be lowered.

Here, the method of operating one light emitting element by using four driving signals DS has been described, but the number of driving signals DS for driving one light emitting element may be changed variably.

Also a method of regulating the pulse width of the driving signal DS may be employed.

Or, a driving signal in the form of a sign wave, instead of a square wave, may be used.

The method of calculating a touched position will now be described in detail.

First, a plurality of detection data (X10, Z1), (X20, Z2), (X30, Z3), (X40, Z4) including position data of the light emitting elements X10 to X40 turned on in such manners as described above with reference to FIGS. 20A and 20B and the light receiving elements Z1 to Z4 turned on correspondingly may be acquired.

Next, the respective detection data may be mapped to orthogonal coordinates system. In this case, the detection data with respect to the second light emitting element X20 and the second light receiving element Z2 may be mapped in such a form as indicated by F2, and the detection data with respect to the fourth light emitting element X40 and the fourth light receiving element Z4 may be mapped in such a form as indicated by F1.

And then, the mapped detection data can be converted by using a mathematical conversion method to acquire a central point of each of the detection data. It is assumed that such a conversion is called a first conversion.

Figure 23:
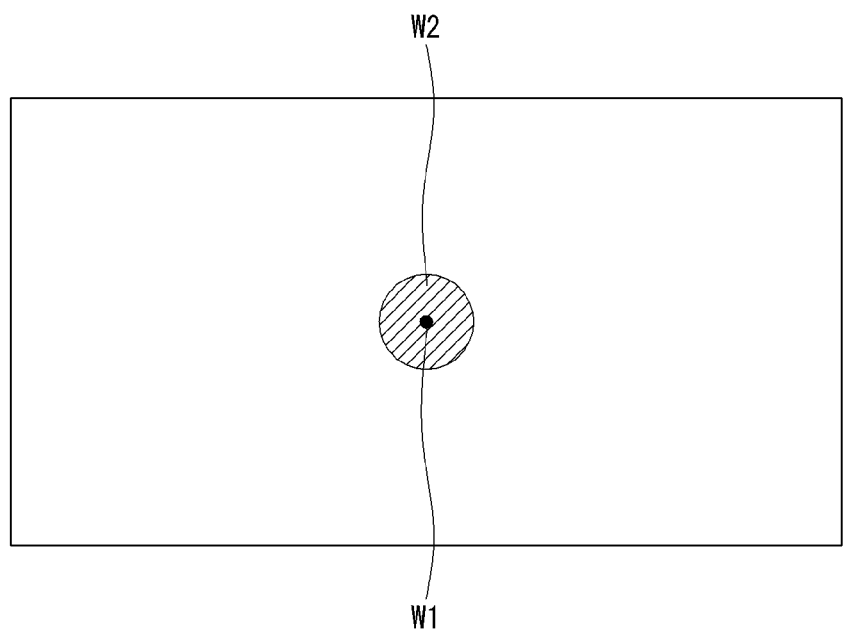

Thereafter, grouping is performed to associate the plurality of mapped detection data corresponding to the same position, and data regarding a central point W1 of the mapped detection data as shown in FIG. 23 may be acquired. Here, the reason for grouping is because, as shown in FIG. 20A, a plurality of detection data (X10, Z1), (X20, Z2), (X30, Z3), (X40, Z4) may correspond to the certain position P and thus the detection data according to the certain position P must be associated.

In the step of acquiring the central point, the number of touches may be acquired through the central point W1. For example, a touch range may be acquired as the size of the certain area W2 based on the central point W1.

Or, after the mapped detection data is primarily converted, data regarding an area W2 as shown in FIG. 23 may be acquired and the central point W2 with respect to the area W2 may be acquired.

And then, the data regarding the central point W1 may be secondarily converted, namely, a reverse conversion of the primary conversion. Then, a plurality of converted detection data including position data of the light emitting elements X10 to X40 turned on again and the light receiving elements Z1 to Z4 turned on accordingly may be acquired.

Here, the converted detection data obtained by reversely converting the data regarding the central point W1 of FIG. 23 may substantially have a form of a straight line.

Figure 22:
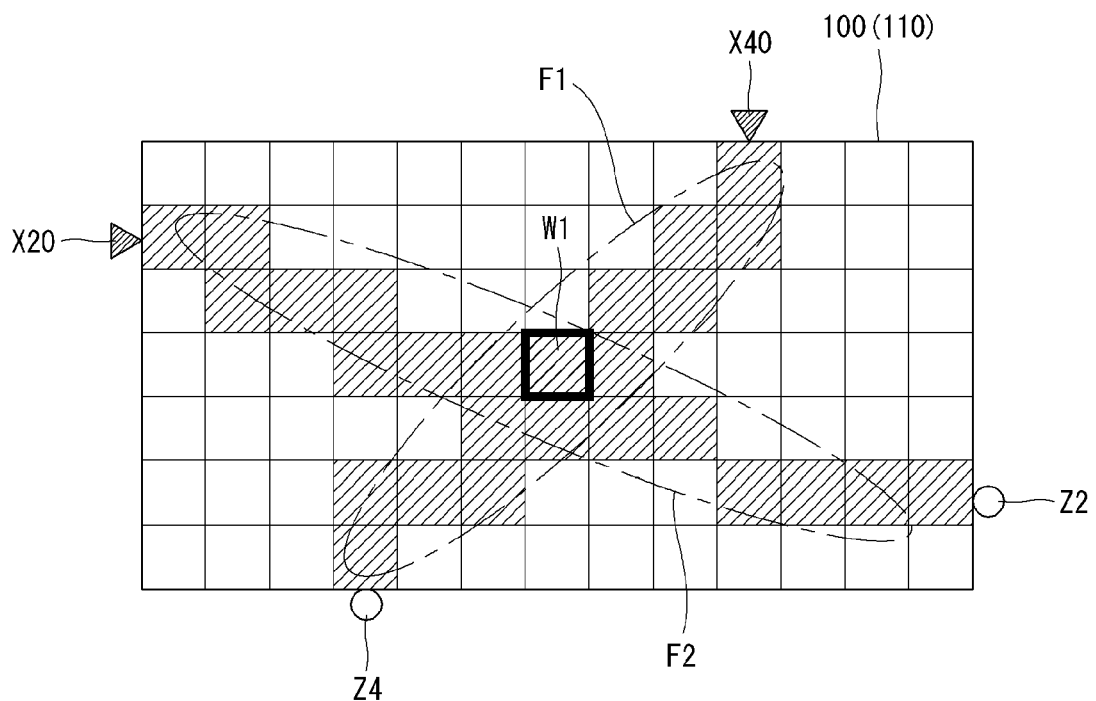
Figure 24:
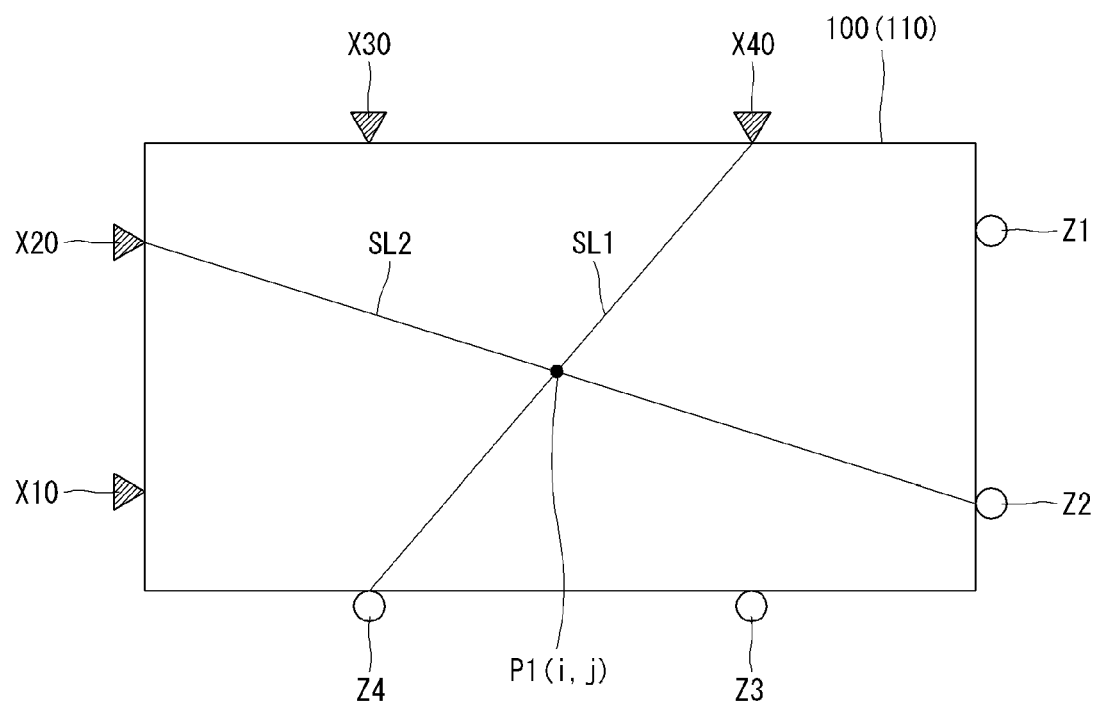

For example, in FIG. 22, the detection data is mapped to the orthogonal coordinates system, so it may have the form of the certain areas (F1, F2), but the central point W1 of each of the detection data is acquired by using the primary conversion as shown in FIG. 23 and the corresponding data is reversely converted, so the converted detection data in the form of straight lines SL1 and SL2 as shown in FIG. 24 can be obtained. Here, it is noted that the area F1 in FIG. 22 is converted into the linear form of SL1 in FIG. 24 and the area F2 in FIG. 22 is converted into the linear form of SL2 in FIG. 24.

Thereafter, as shown in FIG. 24, a crossing point P (i,j) of the converted detection data is obtained to acquire a touched position.

FIGS. 25 to 28 are views for explaining function blocks of the display device including a touch panel according to an exemplary embodiment of the present invention. Hereinafter, a description of a portion which has been already described above in detail will be omitted.

Figure 25:
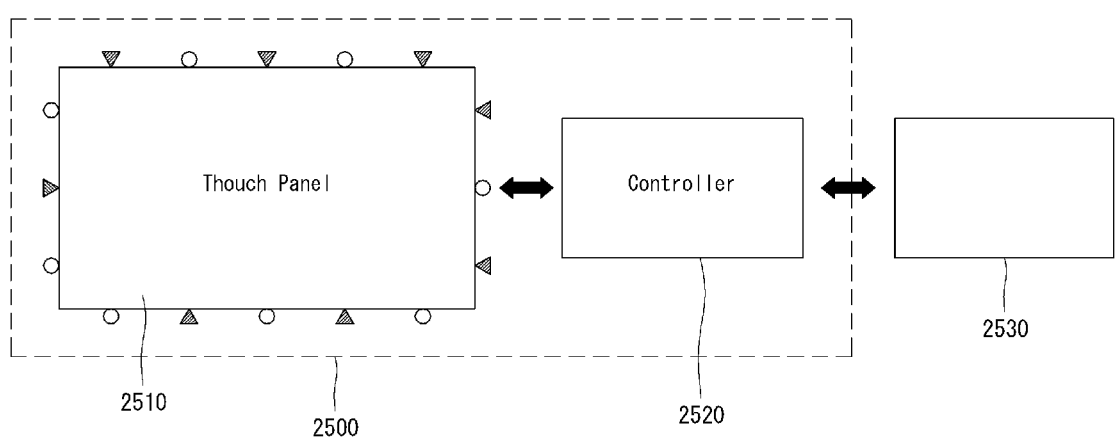
FIGS. 25 to 28 are views for explaining function blocks of the display device including a touch panel according to an exemplary embodiment of the present invention.

With reference to FIG. 25, a display device according to an exemplary embodiment of the present invention may include a touch panel unit 2500 including a touch panel 2510 having a plurality of light emitting elements and a plurality of light receiving elements and a controller 2520, and a display unit 2530.

Here, the display unit 2530 may be at least one of a display panel of a PC, an embedded system, a PDP, an LED, and the like.

The controller 2520 may control the operation of the light emitting elements and the light receiving elements of the touch panel 2510.

Figure 26:
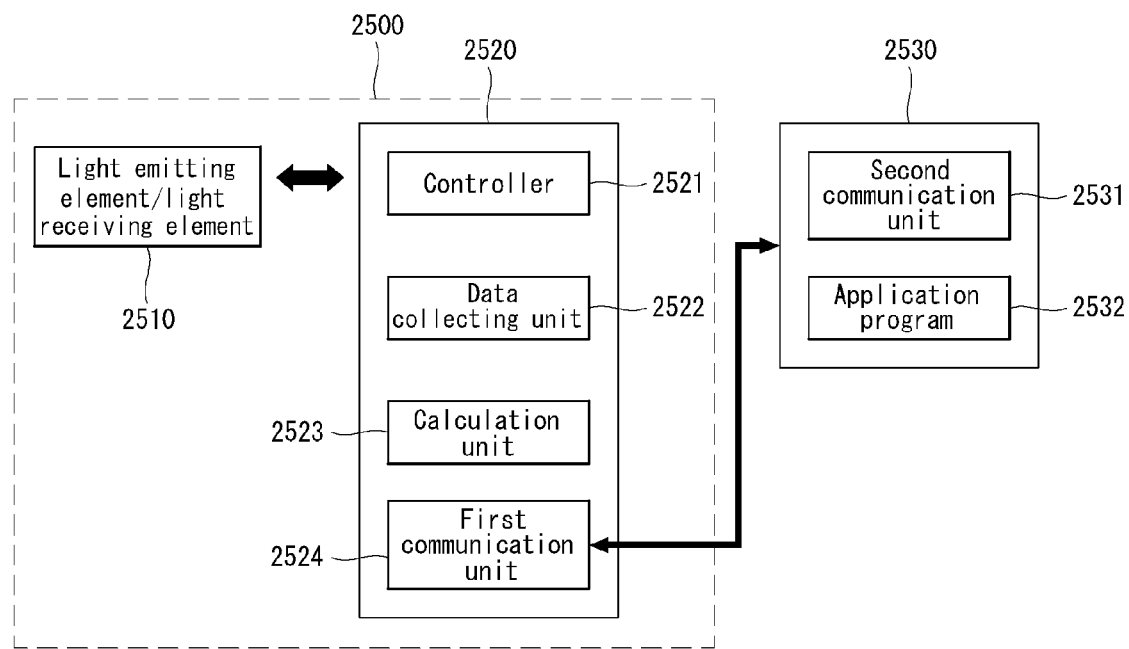

As shown in FIG. 26, the controller 2520 of the touch panel unit 2500 may include a controller 2521, a data collecting unit 2522, a calculation unit 2523, and a first communication unit 2524.

The display unit 2530 may include a second communication unit 2531 and an application program unit 2532.

The controller 2521 may control the plurality of light emitting elements and the plurality of light receiving elements of the touch panel 2510. For example, the controller 2521 may turn on the plurality of light emitting elements according to a certain timing and turn on at least one light receiving element correspondingly according to an ON operation of a certain light emitting element. The operations of the plurality of light emitting elements and the plurality of light receiving elements have been already described above in detail.

The data collecting unit 2522 may collect optical data acquired by the plurality of plurality of light emitting elements and the plurality of light receiving elements operating under the control of the controller 2521. Here, the optical data may refer to detection data.

The calculation unit 2523 may calculate and obtain a touched position on the basis of optical data collected by the data collecting unit 2522. The method of calculating the touched position has been described above in detail.

The first communication unit 2524 may transmit information regarding the touched position calculated by the calculation unit 2523 to the second communication unit 2531 of the display unit 2530.

Then, the display unit 2530 may display the received information regarding the touched position on the screen, store the information regarding the touched position, or apply the information regarding the touched position to the application program unit 2532 using an application program.

Figure 27:
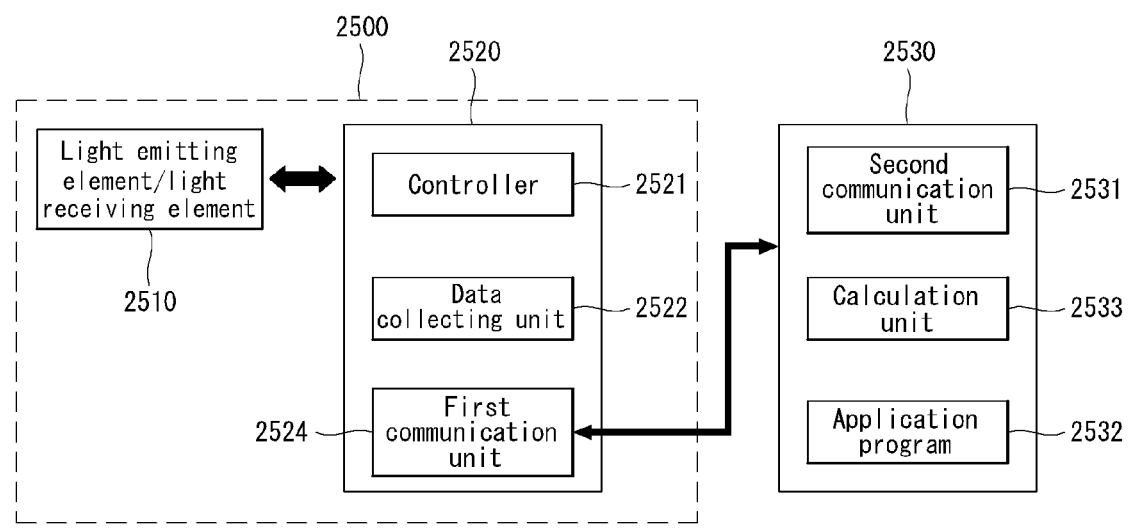

Alternatively, as shown in FIG. 27, the calculation unit of the controller 2520 may be omitted and the calculation unit 2533 may be disposed in the display unit 25530. In this case, the first communication unit 2524 may transmit the optical data collected by the data collecting unit 2522 to the second communication unit 2531 of the display unit 2530, and the calculation unit 2533 may calculate and obtain the touched position on the basis of the optical data received by the second communication unit 2531.

Figure 28:
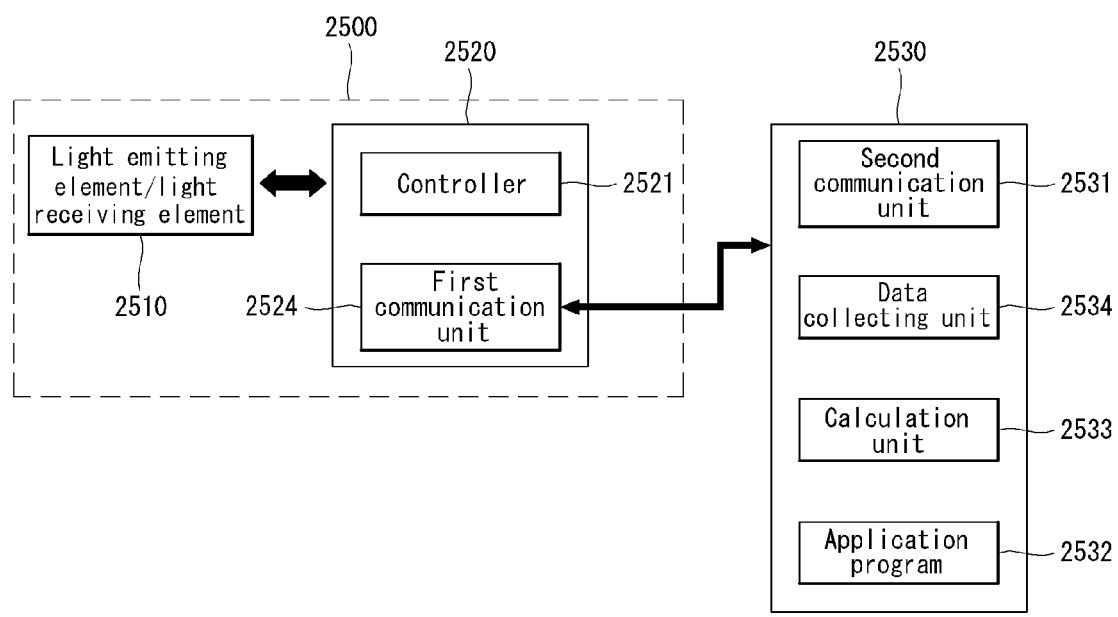

Alternatively, as shown in FIG. 28, the calculation unit and the data collecting unit of the controller 2520 may be omitted, and the calculation unit 2533 and the data collecting unit 2534 may be disposed in the display unit 2530. In this case, the first communication unit 2524 may separately transmit optical data acquired by each of the plurality of light emitting elements and the plurality of light receiving elements operating under the control of the controller 2521 to the second communication unit 2531 of the display unit 2530.

Then, the data collecting unit 2534 of the display unit 2530 may collect the optical data received through the second communication unit 2531 and the calculation unit 2533 may calculate and obtain a touched position on the basis of the optical data collected by the data collecting unit 2534.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures. Moreover, unless the term "means" is explicitly recited in a limitation of the claims, such limitation is not intended to be interpreted under 35 USC 112 (6).

What is claimed is:

1. A touch panel comprising:
   a substrate;
   a plurality of light emitting elements disposed on the substrate; and
   a plurality of light receiving elements disposed on the substrate,
   wherein the number of light receiving elements is greater than the number of light emitting elements,
   wherein the substrate comprises a first long side, a second long side opposite to the first long side, a first short side adjacent to the first and second long sides, and a second short side opposite to the first short side,
   wherein the plurality of light emitting elements and the plurality of light receiving elements are disposed at the first and second long sides and the first and second short sides,
   wherein the light receiving elements are disposed at both ends of the first and second long sides and the first and second short sides,
   wherein at least two light receiving elements are continuously disposed at a corner of the substrate,
   wherein a first light receiving element, a second light receiving element, a third light receiving element, and a fourth light receiving element are continuously disposed maintaining the same distance,
   wherein a first light emitting element is disposed between the first light receiving element and the second light receiving element, and a second light emitting element is disposed between the third light receiving element and the fourth light receiving element,
   wherein a first distance between the first light receiving element and the first light emitting element is smaller than a second distance between the first light receiving element and the second light receiving element,
   wherein the second distance is smaller than a third distance between the first light emitting element and the second light emitting element, and
   wherein at least one light receiving element is disposed between two adjacent light emitting elements.

2. The touch panel of claim 1, wherein an extending line perpendicular to the substrate among the plurality of light emitting elements corresponds to an area between two adjacent light receiving elements.

3. The touch panel of claim 1, wherein the plurality of light emitting elements comprise a third light emitting element disposed at a first area of the substrate and a fourth light emitting element disposed at a second area that faces the first area of the substrate, and the third and fourth light emitting elements overlap in a direction perpendicular to the first and second areas.

4. The touch panel of claim 1, wherein the light emitting element and the light receiving element are alternately disposed at the first and second long sides.

5. A touch panel comprising:
   a substrate;
   a plurality of light emitting elements disposed on the substrate; and
   a plurality of light receiving elements disposed on the substrate,
   wherein a distance between an end of the substrate and the light receiving element and a distance between the end of the substrate and the light emitting element are different,
   wherein, in a horizontal direction, a shortest distance between the end of a short side of the substrate and the light receiving element is smaller than a shortest distance between the end of the short side of the substrate and the light emitting element,
   wherein, in a vertical direction, a shortest distance between the end of a long side of the substrate and the light receiving element is smaller than a shortest distance between the end of the long side of the substrate and the light emitting element,
   wherein a first light receiving element, a second light receiving element, a third light receiving element, and a fourth light receiving element are continuously disposed maintaining the same distance,
   wherein a first light emitting element is disposed between the first light receiving element and the second light receiving element, and a second light emitting element is disposed between the third light receiving element and the fourth light receiving element, wherein a first distance between the first light receiving element and the first light emitting element is smaller than a second distance between the first light receiving element and the second light receiving element, and wherein the second distance is smaller than a third distance between the first light emitting element and the second light emitting element, and wherein at least one light receiving element is disposed between two adjacent light emitting elements.

6. A touch panel comprising:

a substrate;

a plurality of light emitting elements disposed on the substrate; and a plurality of light receiving elements disposed on the substrate, wherein the plurality of light emitting elements comprises first and second light emitting elements, wherein a first gap between the first light emitting element and a corner of the substrate is less than a second gap between the second light emitting element and the corner of the substrate, wherein a radiation angle of the first light emitting element is greater than a radiation angle of the second light emitting element, wherein the first light emitting element is disposed nearer to the corner of the substrate than to the second light emitting element, and wherein at least one light receiving element is disposed between two adjacent light emitting elements.

7. A display device comprising:

a display panel;

a plurality of light emitting elements disposed at an edge of the display panel; and a plurality of light receiving elements disposed at an edge of the display panel, wherein the number of light receiving elements is larger than that of the light emitting elements, wherein the display panel comprises a first long side, a second long side opposite to the first long side, a first short side adjacent to the first and second long sides, and a second short side opposite to the first short side, wherein the plurality of light emitting elements and the plurality of light receiving elements are disposed at the first and second long sides and the first and second short sides, wherein light receiving elements are disposed at both ends of the first and second long sides and the first and second short sides, wherein a first light receiving element, a second light receiving element, a third light receiving element, and a fourth light receiving element are continuously disposed maintaining the same distance, wherein a first light emitting element is disposed between the first light receiving element and the second light receiving element, and a second light emitting element is disposed between the third light receiving element and the fourth light receiving element, wherein a first distance between the first light receiving element and the first light emitting element is smaller than a second distance between the first light receiving element and the second light receiving element, and wherein the second distance is smaller than a third distance between the first light emitting element and the second light emitting element, and wherein the light emitting elements and the light receiving elements are disposed at an outer edge of an active area of the display panel on which an image is displayed.

8. A display device including a touch panel, the device comprising:

a display panel;

a plurality of light emitting elements disposed at an edge of the display panel; and a plurality of light receiving elements disposed at an edge of the display panel, and wherein a distance between an end of the display panel and the light receiving element and a distance between the end of the substrate and the light emitting element are different, wherein, in a horizontal direction, a shortest distance between the end of a short side of the display panel and the light receiving element is smaller than a shortest distance between the end of the short side of the display panel and the light emitting element, wherein, in a vertical direction, a shortest distance between the end of a long side of the display panel and the light receiving element is smaller than a shortest distance between the end of the long side of the display panel and the light emitting element, wherein a first distance between a first light emitting element and a first light receiving element is smaller than a second distance between the first light receiving element and a second light receiving element, and wherein the first light emitting element, the first light receiving element and the second light receiving element are continuously disposed, wherein a first light receiving element, a second light receiving element, a third light receiving element, and a fourth light receiving element are continuously disposed maintaining the same distance, wherein a first light emitting element is disposed between the first light receiving element and the second light receiving element, and a second light emitting element is disposed between the third light receiving element and the fourth light receiving element, wherein a first distance between the first light receiving element and the first light emitting element is smaller than a second distance between the first light receiving element and the second light receiving element, wherein the second distance is smaller than a third distance between the first light emitting element and the second light emitting element, and wherein at least one light receiving element is disposed between two adjacent light emitting elements.

9. A display device comprising:

a display panel;

a plurality of light emitting elements disposed at an edge of the display panel; and a plurality of light receiving elements disposed at an edge of the display panel, wherein the plurality of light emitting elements comprise first and second light emitting elements, wherein a first gap between the first light emitting element and a corner of the substrate is less than a second gap between the second light emitting element and the corner of the substrate, wherein a radiation angle of the first light emitting element is greater than a radiation angle of the second light emitting element, and wherein the first light emitting element is disposed nearer to the corner of the substrate than to the second light emitting element, and wherein at least one light receiving element is disposed between two adjacent light emitting elements.

* * * * *